United States Patent [19]

Norman et al.

[11] Patent Number: 5,717,855

[45] Date of Patent: Feb. 10, 1998

[54] SEGMENTED COMMUNICATIONS ADAPTER WITH PACKET TRANSFER INTERFACE

[75] Inventors: Vernon Roberts Norman, Cary; Sidney Brower Schrum, Jr., Durham, both of N.C.

[73] Assignee: International Business Machines Corporation, Armonk, N.Y.

[21] Appl. No.: 604,201

[22] Filed: Feb. 21, 1996

Related U.S. Application Data

[63] Continuation of Ser. No. 203,239, Feb. 28, 1994, abandoned.

[51] Int. Cl.⁶ ............................................. G06F 13/14
[52] U.S. Cl. .......................... 395/200.2; 395/200.17
[58] Field of Search ........................ 395/200.2, 200.12, 395/200.14, 825, 500, 200.1, 200.17; 370/463

[56] References Cited

U.S. PATENT DOCUMENTS

| | | | |
|---|---|---|---|
| 3,970,798 | 7/1976 | Epenoy et al. | 179/15 |
| 4,631,666 | 12/1986 | Harris et al. | 395/500 |
| 4,805,090 | 2/1989 | Coogan | 395/500 |
| 4,855,905 | 8/1989 | Estrada et al. | 395/500 |
| 5,020,020 | 5/1991 | Pomfret et al. | 395/200 |
| 5,142,622 | 8/1992 | Owens | 395/500 |
| 5,165,022 | 11/1992 | Erhard | 395/825 |
| 5,247,616 | 9/1993 | Berggren | 395/200.01 |
| 5,321,819 | 6/1994 | Szczepanek | 395/325 |
| 5,414,707 | 5/1995 | Johnston et al. | 370/79 |
| 5,481,735 | 1/1996 | Mortensen et al. | 395/200.1 |
| 5,490,252 | 2/1996 | Macera et al. | 395/200.01 |
| 5,491,812 | 2/1996 | Pisello et al. | 395/500 |
| 5,535,373 | 7/1996 | Olnowich | 395/500 |

Primary Examiner—Larry D. Donaghue
Attorney, Agent, or Firm—Joscelyn G. Cockburn

[57] ABSTRACT

A data transfer device for use in a communications highway includes an integrated bus for transmitting data signals and command signals, an address bus and a control line for transmitting control signals which indicate the presence of command signals and/or data signals on the integrated bus. A bus control point (BCF) allows entities to use the integrated bus based upon request signals received from the entities. In addition, devices are provided to generate commands or data on the integrated bus. The data transfer device in combination with a Network Interface Unit (NIU) and a Machine Interface Unit (MIU) provides an adapter which couples work stations, computers or the like to a local area network (LAN).

10 Claims, 32 Drawing Sheets

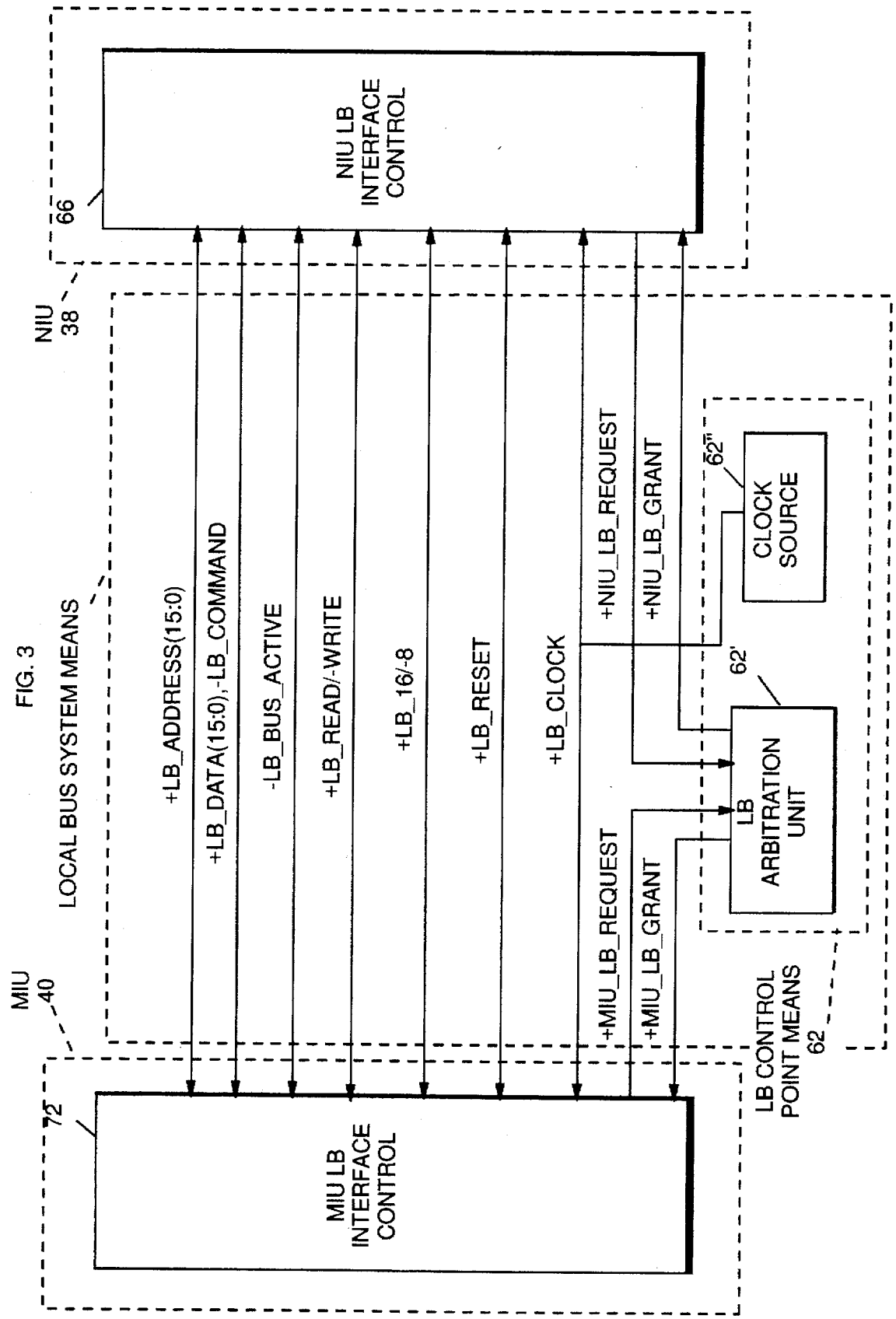

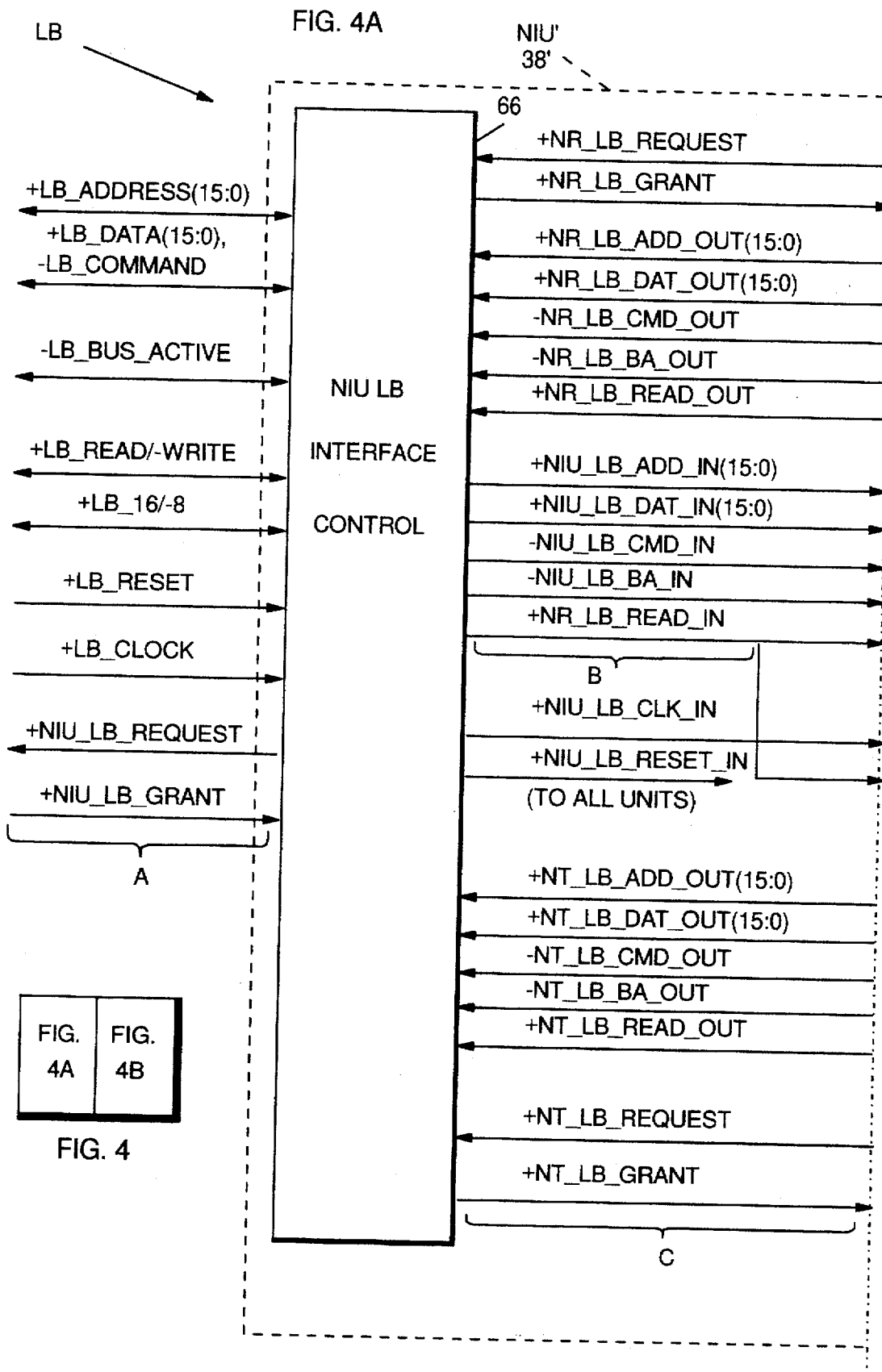

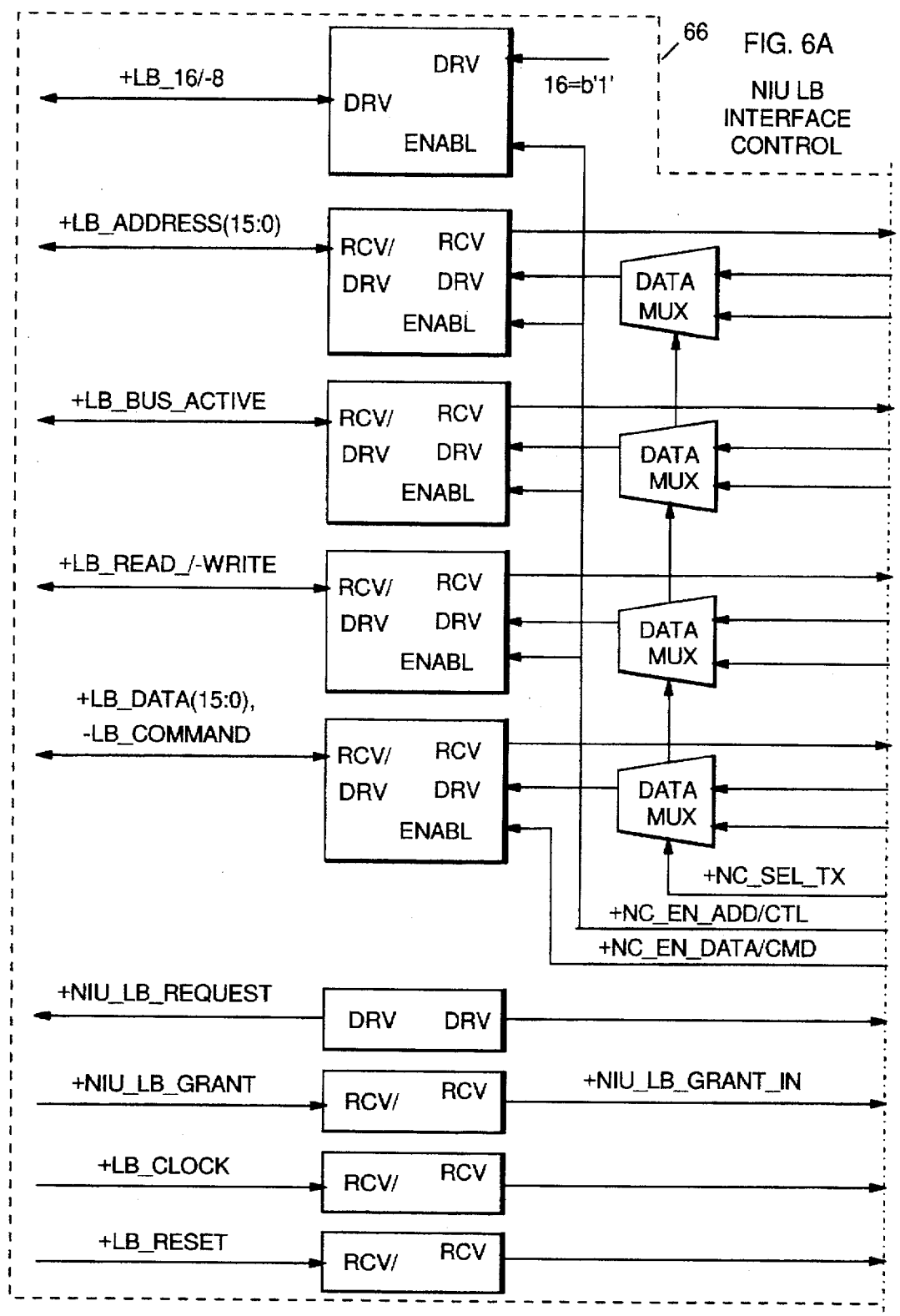

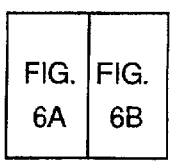
FIG. 6B      FIG. 6
+NC_SEL_TX      =+NT_LB_GRANT
+NC_EN_ADD/CTL =+NIU_LB_GRANT_IN AND
(+NIU_LB_GRANT_IN DELAYED 1 CLOCK CYCLE)
+NC_EN_DATA/CMD =+NC_EN_ADD/CTL AND NOT +LB_READ/-WRITE
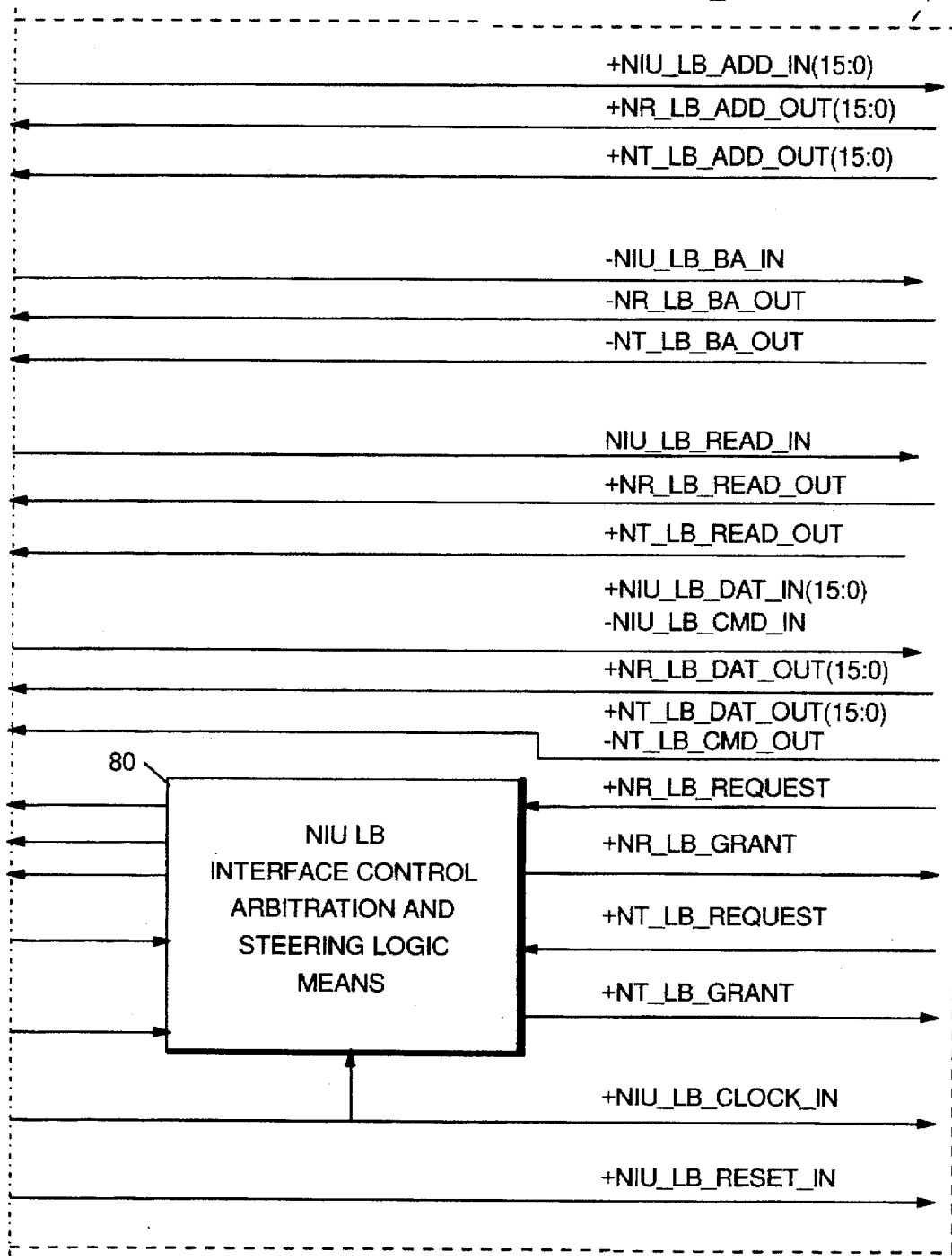

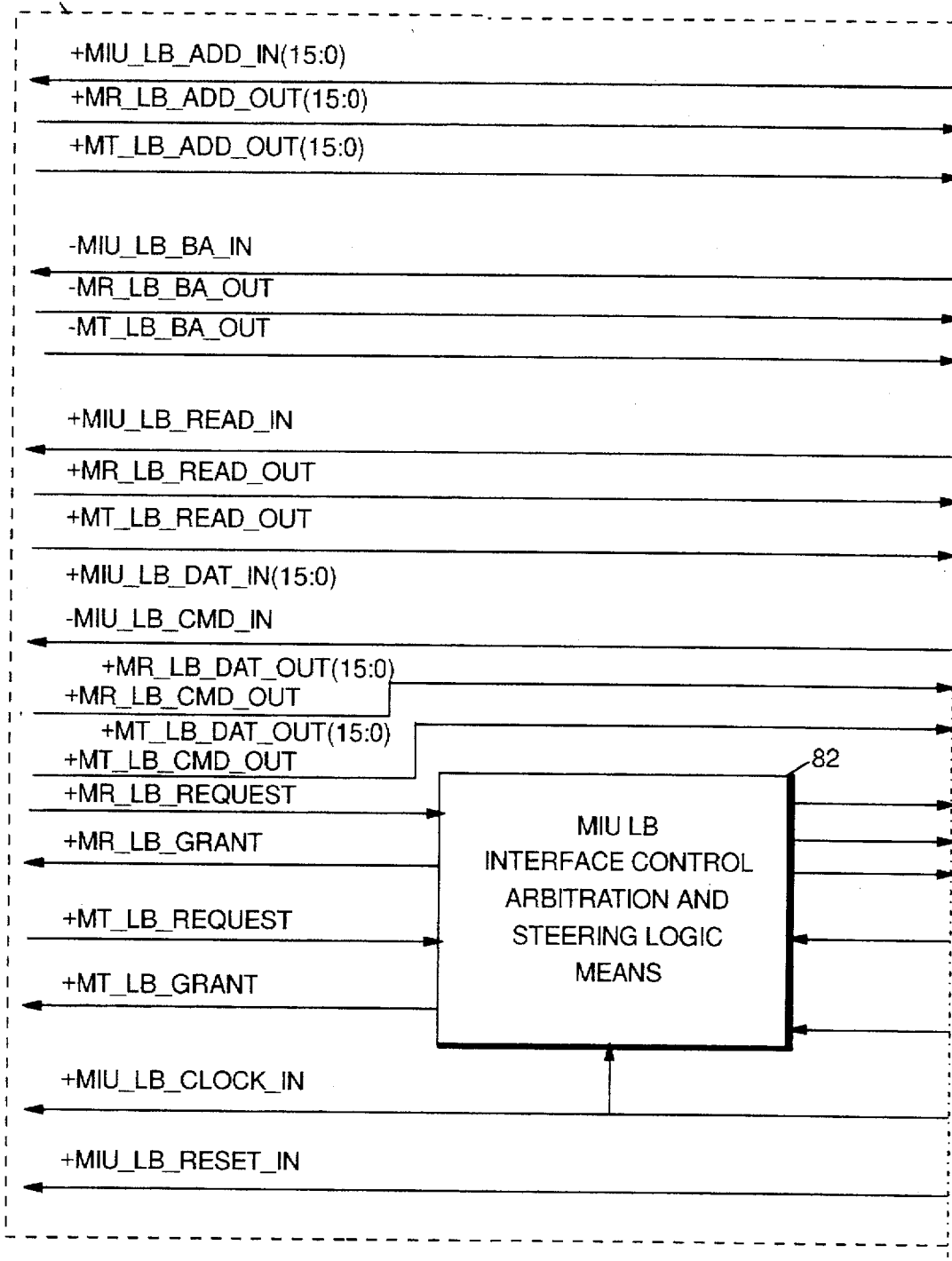

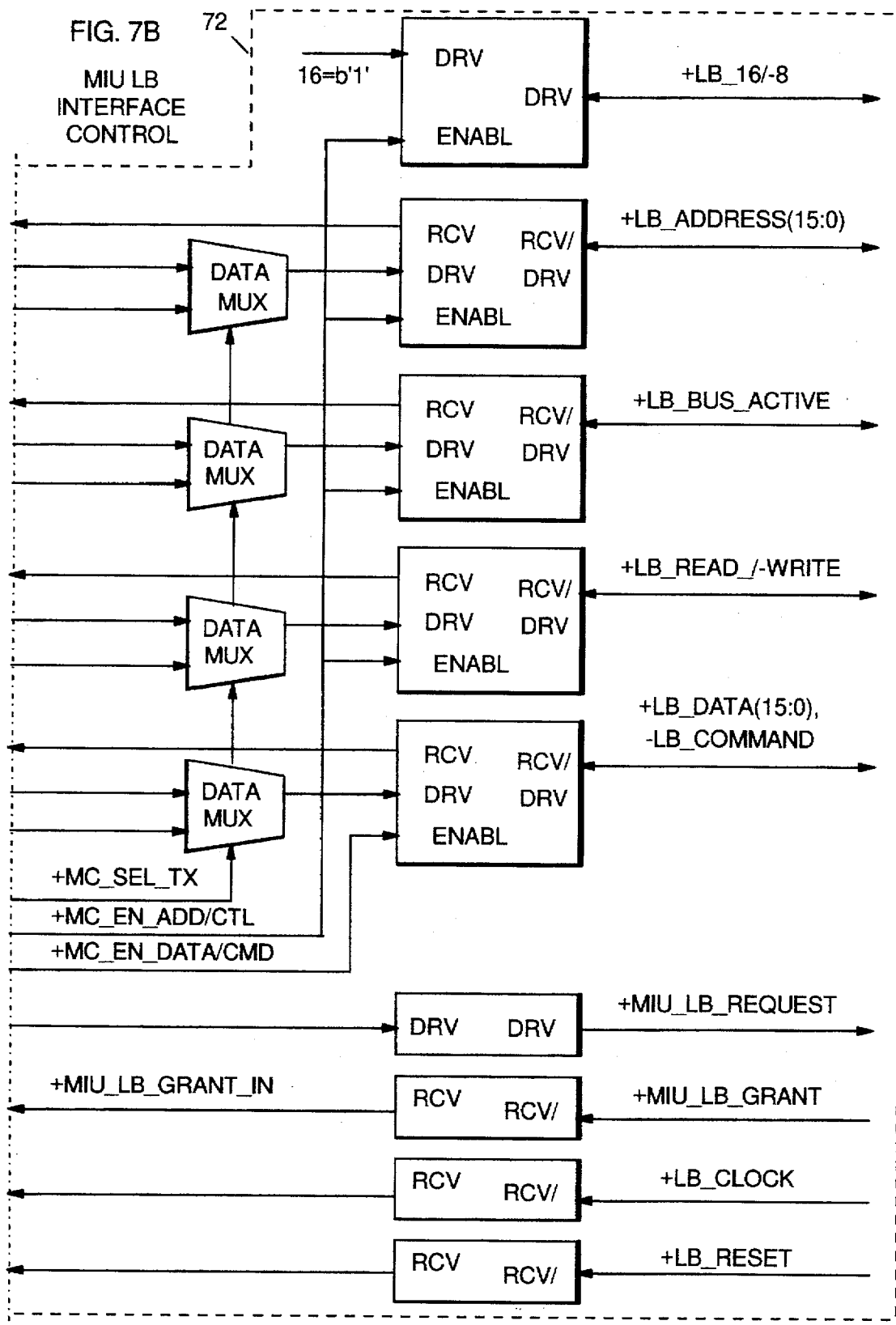

NIU RX PTI STATE MACHINE

FIG. 10

```
NIU RX PTI STATE MACHINE - OUTPUTS
+NR_NEXT_XFER                       = NRP2-2a OR (NRP3-2 AND NOT +NR_COMP_STAT) OR NRP4-0 OR NRP5-5
+NR_AM_ACK                          = NRP2-2b
+NR_LB_REQUEST                      = NRP1 OR (NRP3 OR NRP4) AND NOT +NR_LB_GRANT) OR (NRP2 OR NRP3)
                                      AND NOT +NR_FIFO_EMPTY)
-NR_LB_BA_OUT                       = NOT (NRP1 OR NRP2 OR (NRP3 AND NOT +NR_COMP_STAT) OR NRP4)
+NR_RSTC                            = NRP0
+NR_INCC1                           = +NR_BYTE AND +NR_NEXT_XFER
+NR_INCC2                           = (NOT +NR_BYTE) AND +NR_NEXT_XFER

+NR_SEL_STAT_PORT_ADD               = NRP4
+NR_SEL_FIDAT                       = (NRP2-2a OR NRP3-2) AND NOT +NR_BYTE) OR NRP4
+NR_SEL_AMC                         = NRP2-2b
+NR_SEL_SOAC                        = NRP2-3b AND +NR_CEQ2
+NR_SEL_SOIC                        = NRP2-3b AND +NR_CEQ14
+NR_SEL_BYTE                        = (NRP2-2a OR NRP3-2) AND +NR_BYTE
+NR_SEL_SOFC                        = NRP1
+NR_SEL_EOFC                        = NRP2-5
+NR_SEL_SOCRCC                      = NRP2-3a

OTHER NIU RX PTI SIGNALS
+NR_DEC_PTI_CMD/DAT_PORT_WRITE      = (NOT -NIU_LB_BA_IN) AND (NOT +NIU_LB_READ_IN) AND (+NIU_LB_ADD_IN(15:0)=h'FF00')
                                      AND (NOT -NIU_LB_CMD_IN)
+NR_DEC_RXFLUSH                     = +NR_DEC_PTI_CMD/DAT_PORT_WRITE AND (+NIU_LB_DAT_IN(15:12)=h'F')
                                      AND (NOT -NIU_LB_CMD_IN)
+NR_DEC_RXREJECT                    = +NR_DEC_PTI_CMD/DAT_PORT_WRITE AND (+NIU_LB_DAT_IN(15:12)=h'E')
                                      AND (NOT -NIU_LB_CMD_IN)
```

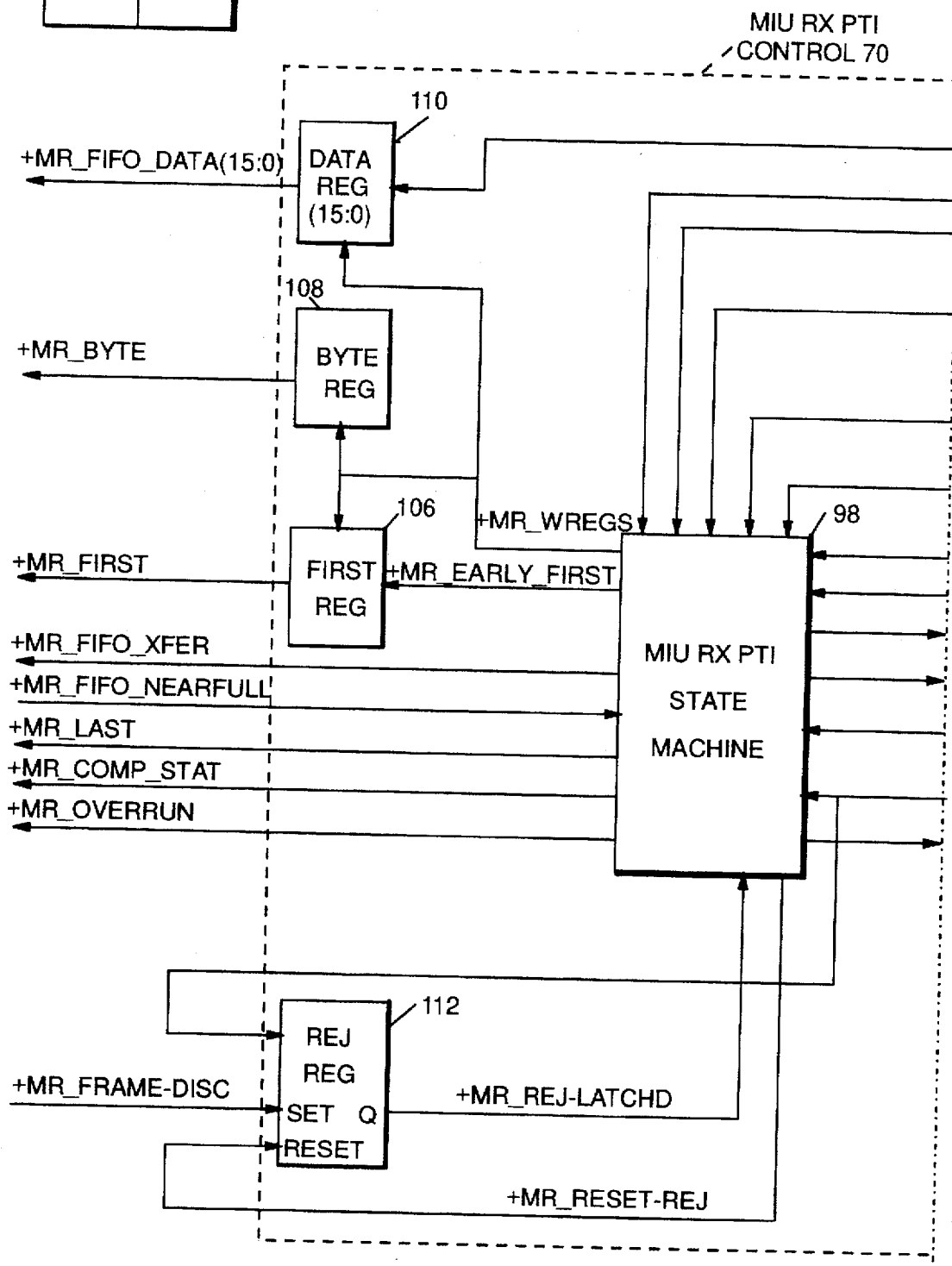

MIU RX PTI STATE MACHINE

FIG. 13

MIU RX PTI STATE MACHINE - OUTPUTS

+MR_LB_REQUEST = (+MR_REJ_LATCHED AND (MRP5 OR MRP8)) OR ((NOT +MR_LB_GRANT) AND (+MR_REJ_LATCHED OR MRP5 OR MRP8))

-MR_LB_BA_OUT = MRP5 OR MRP8
+MR_FIFO_XFER = MRP1-2 OR MRP2-2 OR MRP2-3 OR MRP2-5 OR MRP4-0 OR MRP7-0
+MR_EARLY_FIRST = MRP1
+MR_LAST = MRP2-3 OR MRP2-5
+MR_COMP_STAT = MRP4 OR MRP7
+MR_OVERRUN = MRP5 OR MRP6 OR MRP7
+MR_WREGS = MRP1-2 OR MRP2-2 OR MRP3-4 OR MRP5-7 OR MRP6-7
+MR_SEL_REJC = +MR_REJ_LATCHED
+MR_RESET_REJ = +MR_REJ_LATCHED AND +MR_LB_GRANT

OTHER MIU RX PTI SIGNALS

+MR_DEC_PTI_CMD/DAT_PORT_WRITE = (NOT -MIU_LB_BA_IN) AND (NOT +MIU_LB_READ_IN) AND (+MIU_LB_ADD_IN(15:0)=h'FF10')

+MR_DEC_PTI_STATUS_PORT_WRITE = (NOT -MIU_LB_BA_IN) AND (NOT +MIU_LB_READ_IN) AND (+MIU_LB_ADD_IN(15:0)=h'FF12')

+MR_DEC_BYTEC = +MR_DEC_PTI_CMD/DAT_PORT_WRITE AND (+MIU_LB_DAT_IN(15:12)=h'8') AND (NOT -MIU_LB_CMD_IN)

+MR_DEC_SOFC = +MR_DEC_PTI_CMD/DAT_PORT_WRITE AND (+MIU_LB_DAT_IN(15:12)=h'0') AND (NOT -MIU_LB_CMD_IN)

+MR_DEC_EOFC = +MR_DEC_PTI_CMD/DAT_PORT_WRITE AND (+MIU_LB_DAT_IN(15:12)=h'B') AND (NOT -MIU_LB_CMD_IN)

FIG. 14

PTI FRAME STRUCTURE

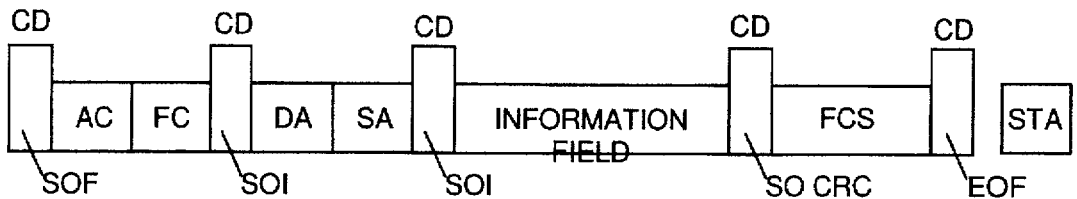

NOTES:  CD = COMMAND
SOF = START OF FRAME
SOA = START OF ADDRESS
SOI = START OF INFORMATION
SO CRC = START OF CRC
EOF = END OF FRAME
STA = STATUS (15:0)

FIG. 15

PTI COMMAND STRUCTURE

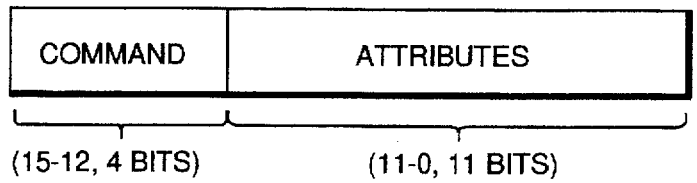

FIG. 16

TOKEN RING FRAME STRUCTURE
(IEEE 802.6)

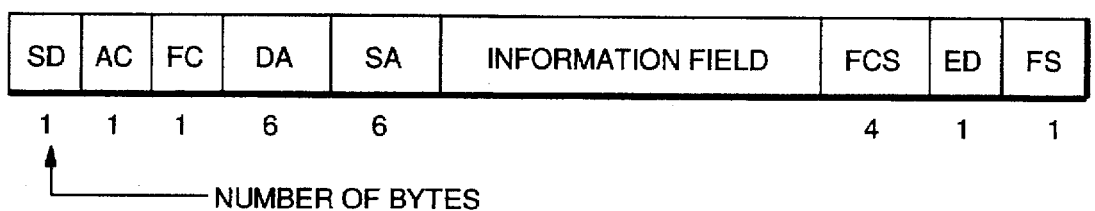

NOTES:

SD = START DELIMITER          DA = DESTINATION ADDRESS
ED = END DELIMITER            SA = SOURCE ADDRESS
AC = ACCESS CONTROL FIELD     FCS = FRAME CHECK SEQUENCE
FC = FRAME CONTROL FIELD      FS = FRAME STATUS FIELD

NIU TX PTI STATE MACHINE

FIG. 19A

| TRANSFER | COMMAND/DATA | CODE | BUS MASTER | READ/WRITE | SLAVE TARGET REGISTER |
|---|---|---|---|---|---|
| PTI RECEIVE PRIMARY TRANSFERS ||||||
| DATA TRANSFER | DATA | - - - | NIU | WRITE | COMMAND/DATA PORT |
| COMPLETION STATUS | DATA | - - - | NIU | WRITE | STATUS PORT |
| START OF FRAME | COMMAND | X'0_ _ _' | NIU | WRITE | COMMAND/DATA PORT |
| DATA BYTE COMMAND | COMMAND | X'8_ _ _' | NIU | WRITE | COMMAND/DATA PORT |
| END OF FRAME | COMMAND | X'B_ _ _' | NIU | WRITE | COMMAND/DATA PORT |
| FLUSH RECEIVE | COMMAND | X'F_ _ _' | MIU | WRITE | COMMAND/DATA PORT |

FIG. 19B

| TRANSFER | COMMAND/DATA | CODE | BUS MASTER | READ/WRITE | SLAVE TARGET REGISTER |
|---|---|---|---|---|---|
| PTI RECEIVE OPTIONAL TRANSFERS ||||||
| START OF ADDRESS | COMMAND | X'1_ _ _' | NIU | WRITE | COMMAND/DATA PORT |
| START OF INFORMATION | COMMAND | X'2_ _ _' | NIU | WRITE | COMMAND/DATA PORT |
| START OF CRC | COMMAND | X'A_ _ _' | NIU | WRITE | COMMAND/DATA PORT |
| STATUS COMMAND | COMMAND | X'9_ _ _' | NIU | WRITE | COMMAND/DATA PORT |
| ADDRESS MATCH COMMAND | COMMAND | X'3_ _ _' | NIU | WRITE | COMMAND/DATA PORT |

FIG. 19C

| TRANSFER | COMMAND/DATA | CODE | BUS MASTER | READ/WRITE | SLAVE TARGET REGISTER |
|---|---|---|---|---|---|
| PTI RECEIVE ASYNCHRONOUS TRANSFERS ||||||
| REJECTED FRAME | COMMAND | X'E_ _ _' | MIU | WRITE | COMMAND/DATA PORT |

| TRANSFER | COMMAND/ DATA | CODE | BUS MASTER | READ/ WRITE | SLAVE TARGET REGISTER |
|---|---|---|---|---|---|
| PTI TRANSMIT PRIMARY TRANSFERS ||||||
| DATA TRANSFER | DATA | — | NIU | READ | COMMAND/ DATA PORT |
| COMPLETION STATUS | DATA | — | NIU | WRITE | STATUS PORT |
| START OF FRAME WO/CRC | COMMAND | X'0_ _' | MIU | WRITE | COMMAND/ DATA PORT |
| START OF FRAME W/CRC | COMMAND | X'1_ _' | MIU | WRITE | COMMAND/ DATA PORT |
| DATA BYTE COMMAND | COMMAND | X'2_ _' | NIU | READ | COMMAND/ DATA PORT |
| END OF FRAME | COMMAND | X'4_ _' | NIU | READ | COMMAND/ DATA PORT |
| ABORT TRANSMIT | COMMAND | X'C_ _' | NIU | READ | COMMAND/ DATA PORT |
| FLUSH TRANSMIT | COMMAND | X'F_ _' | NIU | WRITE | COMMAND/ DATA PORT |

FIG. 20A

| PTI TRANSMIT OPTIONAL TRANSFERS ||||||
|---|---|---|---|---|---|
| ATTRIBUTE COMMAND | COMMAND | X'3_ _' | NIU | READ | COMMAND/ DATA PORT |

FIG. 20B

| PTI TRANSMIT ASYNCHRONOUS TRANSFERS ||||||
|---|---|---|---|---|---|
| ENABLE TRANSMIT | COMMAND | X'D_ _' | MIU | WRITE | COMMAND/ DATA PORT |
| DISABLE TRANSMIT | COMMAND | X'E_ _' | MIU | WRITE | COMMAND/ DATA PORT |

NIU TX PTI STATE MACHINE - OUTPUTS

| | | |
|---|---|---|
| +NT_LB_REQUEST | = | (MTP1 OR MTP2) AND NOT +MT_FIFO_NEARFULL) OR ((MTP4 OR MTP5) AND NOT +MT_LB_GRANT) |
| +NT_LB_READ_OUT | = | MTP1 OR MTP2 |
| -NT_LB_BA_OUT | = | MTP1 OR MTP2 OR MTP4 OR MTP5 |
| +NT_SEL_STATUS | = | MTP4 |
| +NT_FIFO_XFER | = | MTP2-2 OR MT2-3 OR MTP2-5 |
| +NT_LAST | = | MTP2-3 OR MTP2-5 |
| +NT_ABORT | = | ((MTP2-3 AND +MT_DEC_ABORTC) OR MTP2-5 |
| +NT_EARLY_FIRST | = | MTP1-2 |
| +NT_WREGS | = | MTP1-2 OR MTP2-2 |

OTHER NIU TX PTI SIGNALS

| | | |
|---|---|---|
| +NT_DEC_PTI_CMD/DAT_PORT_WRITE | = | (NOT -NIU_LB_BA_IN) AND (NOT +NIU_LB_READ_IN) AND (+NIU_LB_ADD_IN(16:0)=h'FF04') |
| +NT_DEC_SOFNOCC | = | +MT_DEC_PTI_CMD/DAT_PORT_WRITE AND (NOT -NIU_LB_CMD_IN) AND (+NIU_LB_DAT_IN(15:12)=h'0') |
| +NT_DEC_SOFCRC | = | +MT_DEC_PTI_CMD/DAT_PORT_WRITE AND (NOT -NIU_LB_CMD_IN) AND (+NIU_LB_DAT_IN(15:12)=h'1') |
| +NT_DEC_ATTRC | = | (NOT -NIU_LB_CMD_IN) AND (+NIU_LB_DAT_IN(15:12)=h'3') |
| +NT_DEC_BYTEC | = | (NOT -NIU_LB_CMD_IN) AND (+NIU_LB_DAT_IN(15:12)=h'2') |
| +NT_DEC_EOFC | = | (NOT -NIU_LB_CMD_IN) AND (+NIU_LB_DAT_IN(15:12)=h'4') |
| +NT_DEC_ABORTC | = | (NOT -NIU_LB_CMD_IN) AND (+NIU_LB_DAT_IN(15:12)=h'C') |

MIU TX PTI STATE MACHINE

FIG. 24

MIU TX PTI STATE MACHINE - OUTPUTS

| | | |
|---|---|---|
| +MT_LB_REQUEST | = | +MTP1 AND NOT +MT_LB_GRANT |
| +MT_LB_BA_OUT | = | MTP1 |
| =MT_FIFO_NEXT | = | MTP0-0 OR MTP3-3 OR MTP3-4 OR MTP5-5 OR MTP6-6 |
| +MT_UNDERRUN | = | MTP6 |
| +MT_STAT_XFER | = | MTP5-0 OR MTP6-0 |
| +MT_SEL_FIDAT | = | (MTP3-3 OR MTP3-4) AND NOT +MT_BYTE |
| +MT_SEL_BYTE | = | (MTP3-3 OR MTP3-4) AND +MT_BYTE |
| +MT_SEL_SOFCC | = | MTP1 AND NOT +MT_NOCRC_MODE |
| +MT_SEL_SOFNCC | = | MTP1 AND +MT_NOCRC_MODE |
| +MT_SEL_ATTR | = | MTP2 |
| +MT_SEL_EOFC | = | MTP4 |
| +MT_SEL_ABORT | = | MTP3-6 |

OTHER MIU TX PTI SIGNALS

| | | |
|---|---|---|
| +MT_DEC_PTI_CMD/DAT_PORT_READ | = | +MIU_LB_READ_IN AND (NOT -MIU_LB_BA_IN) AND (+MIU_LB_ADD_IN(15:0)=h'FF14') |
| +MT_DEC_PTI_STAT_PORT WRITE | = | (NOT +MIU_LB_READ_IN) AND (NOT -MIU_LB_BA_IN) AND (+MIU_LB_ADD_IN(15:0)=h'FF16') |
| +MT_DEC_PTI_CMD/DAT_PORT WRITE | = | (NOT +MIU_LB_READ_IN) AND (NOT -MIU_LB_BA_IN) AND (+MIU_LB_ADD_IN(15:0)=h'FF14') |
| +MT_DEC_TXFLUSH | = | +MT_DEC_PTI_CMD/DAT_PORT WRITE AND NOT (-MIU_LB_CMD_IN) (+MIU_LB_DAT_IN(15:12)=h'F') |

SEGMENTED COMMUNICATIONS ADAPTER WITH PACKET TRANSFER INTERFACE

CROSS-REFERENCE TO RELATED APPLICATION

This application is a continuation of U.S. application Ser. No. 08/203,239 filed Feb. 28, 1994, now abandoned.

BACKGROUND OF THE INVENTION

1. Field of the Invention

The present invention relates to communications networks in general and in particular to devices which transmit information at media speed between the communications networks and utilization devices such as computers, workstations or the like.

2. Prior Art

The communications industry has seen a proliferation of network type protocols and machine types; all of which have to be integrated in a unified communications network, so that information can be exchanged between data terminal equipment (DTEs). A basic conventional communications network is comprised of a communications highway (transmission media), coupling devices (referred to as an adapters) and DTEs (e.g., computer, workstations or the like). The basic conventional communications network are interconnected by routers, bridges or the like to form more complex networks.

Usually, the network type is dictated by the physical configuration of the transmission media and the protocol which is used to transmit information on the network. As a consequence, a token ring network is one type of network in which the transmission media is a conductive wire or other appropriate media configured into a loop or ring and only DTEs having a token (special frame) can transmit data onto the network. The token ring network is described more fully in the IEEE 802.5 Standard for Local Area Networks.

Likewise, a token bus network is another type of network in which a token is required before a station can transmit onto a bus structure media.

Still other types of networks include FDDI (Fiber Data Distribution Interface) in which the transmission media is optical fiber and the FDDI protocols Control communication on the network. Finally, there is the collision type network in which the transmission media could be electrically conductive wire and a collision type protocol is used to control the exchange of information on the network.

Even though the network types and protocols may be different, the basic components (i.e., the transmission media, adapters and DTEs) operate in a common way to distribute information in the network. In particular, the transmission media propagates electrical signals which conveys information and the adapters interface the DTEs to the transmission media. The prior art has made significant strides in improving the quality of the transmission media. As a consequence, media data rate in excess of 100 Mbps is available. This high speed data rate far exceeds the need of most users.

Notwithstanding the improvements to the transmission media, very little to nothing has been done to improve the quality of the adapters. It is desirable to provide adapters which are able to transmit data at media speed between the transmission media and the DTE which it attaches to the media.

One of the problem areas is the inability of the adapter to transfer data to its device at the rate at which the data is being transmitted on the network. The inability is due to bottlenecks occurring within the prior art adapters.

Another one of the problem areas that needs to be addressed is the relatively high cost and long lead time needed to develop a new adapter. The same may be said for supporting software. It is also desirable to provide an adapter which is able to attach different types of machines to a network.

It is believed the high cost/long lead time problem, for the most part, is due to the approach used to design most adapters. In general, the adapter's hardware, VLSI chips and software are specific to certain variables including a particular type of network, a limited set of attaching machines and a particular cost/function design point. Providing the variables remains constant, one can expect the adapter design to be repeatable and a lowering of the attachment cost. However, if one of the variables changes, the design has to be redone with relatively high attachment cost. In summary, it is believed the design of prior art adapters is functionally inflexible.

SUMMARY OF THE INVENTION

It is, therefore, the main object of the present invention to provide an adapter which is more efficient than has heretofore been possible.

It is another object of the present invention to provide an adapter with functional flexibility requiring minimal rework to accommodate more changes in any of the design parameters.

It is still another object of the present invention to provide an adapter which transmits information at media speed between an attached device and associated communication highway.

The above and other objects are met by providing a segmented adapter which includes a Network Interface Unit (NIU), a Machine Interface Unit (MIU) and a Packet Transfer Interface unit (PTI). The NIU is communications protocol specific (i.e., token ring, token bus, ethernet, etc.) and attachment mechanism specific (buffer structures, buffer descriptors, etc.) and couples the adapter to a communications highway. The MIU is computing machine attachment bus specific (i.e., MicroChannel®, ISA, EISA, etc.) and couples the adapter to the computing machine. The PTI interconnects the NIU and the MIU. The PTI allows the streaming of data or data integrated with commands or commands to be exchanged between the NIU and MIU.

In particular, the PTI includes a bus which transmits data and/or commands, a control line which transmits signals to distinguish data from commands and respective controllers which generate and place different commands on the bus so that packets of information are received from and transmitted on the communications highway.

BRIEF DESCRIPTION OF THE DRAWINGS

FIG. 3 shows the local bus (LB) structure for interconnecting the MIU and the NIU.

FIGS. 4, 4A and 4B show block diagrams for the NIU'.

FIGS. 5, 5A and 5B show block diagrams for the MIU'.

FIGS. 6, 6A and 6B show block diagram for the NIU Local Bus Interface Control Means.

FIGS. 7, 7A and 7B show block diagrams for the MIU Local Bus Interface Control Means.

FIG. 10 shows a table listing NIU Rx PTI Control Signals.

FIGS. 11, 11A and 11B show block diagrams for the MIU Rx PTI Control Means.

FIG. 13 shows a table listing MIU Rx PTI State Machine Output signals and other MIU Rx PTI signals.

FIG. 14 shows a graphical representation of a token ring frame interspersed with commands according to the teachings of the present invention.

FIG. 15 shows a graphical representation of a Command Format according to the teachings of the present invention.

FIG. 16 shows a prior art token ring frame structure.

FIGS. 17, 17A and 17B show block diagrams for NIU TX PTI Control.

FIGS. 19A–19C show a listing of Receive Transfers including commands.

FIGS. 20A, 20B and 20C show listings of transmit transfers.

FIG. 21 shows a table listing NIU TX PTI State Machine output signals and other NIU TX PTI signals.

FIGS. 22, 22A and 22B show block diagrams of the MIU TX PTI Control (CTL).

FIG. 24 shows a table listing MIU TX PTI state machine output signals and other MIU TX PTI signals.

DETAILED DESCRIPTION

The invention (to be described hereinafter) works well within a communications adapter and as such will be described in that environment. The use of the invention in an adapter should not be construed as a limitation on the scope of the invention; since the invention works equally well in routers, hubs and other network interconnecting devices.

Figure 1:
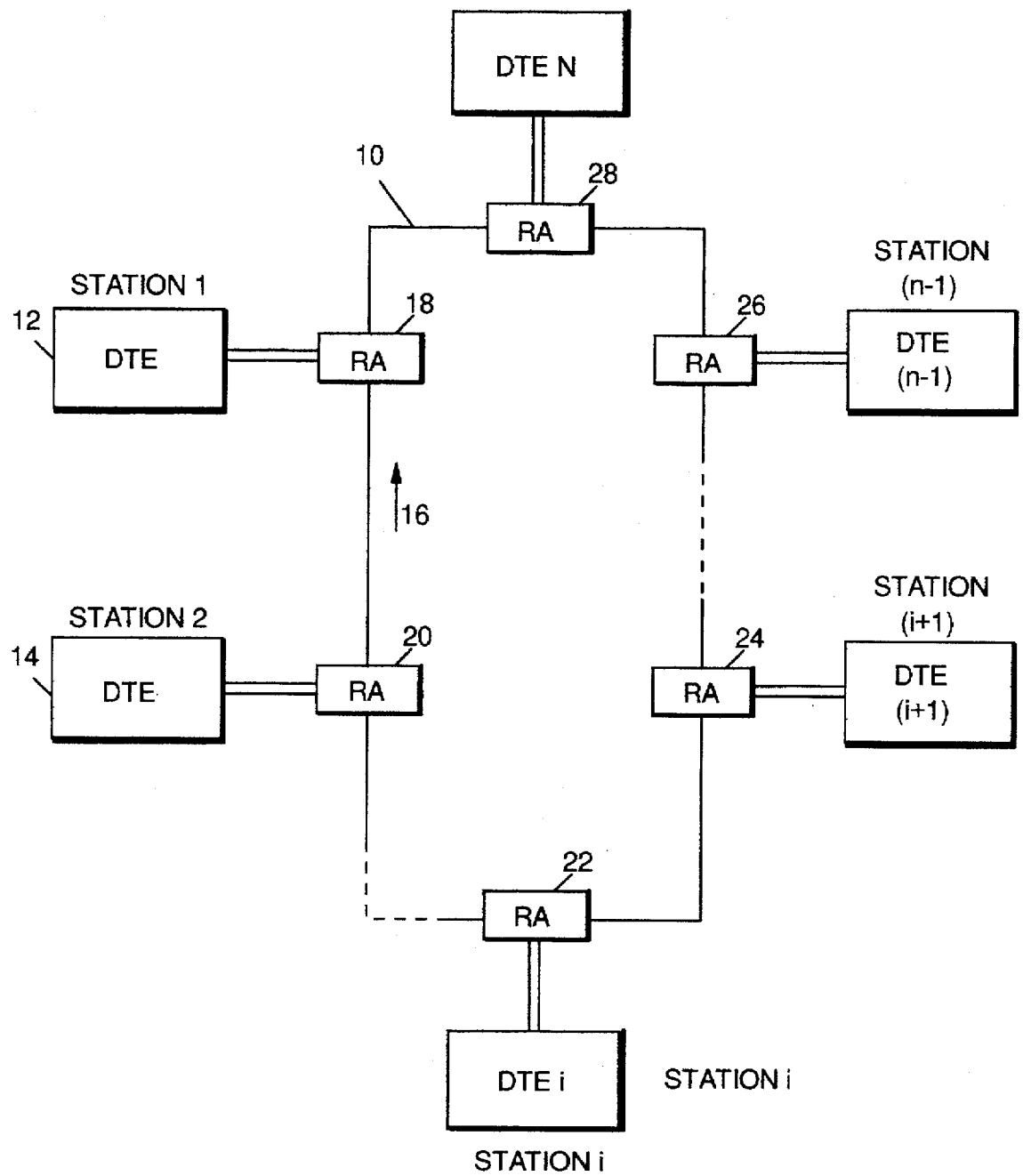
FIG. 1 shows a block diagram of a communications network in which the segmented adapter may be used.

FIG. 1 shows a serial communications network in which the present invention (to be described hereinafter) may be used. The serial ring communications network includes a closed loop unidirectional transmission media identified by numeral 10. The closed loop unidirectional transmission media interconnects a plurality of data terminal equipments (DTEs) or data terminal units (DTUs) 12, 14 . . . i, i+1 . . . n=1 and n. Each data terminal unit may include one or more devices such as word processor, display terminals, microcomputers or PCs data collectors, telephone type apparatus, etc. The function of the communications network is to provide the mechanism by which data or other information can be distributed between the devices on the network. Data transmission in the network is unidirectional in the direction shown by 16. Each DTE is connected to the transmission media 10 by ring adapter (RA) 18, 20, 22, 24, 26 and 28 respectively. The function of the ring adapter is to provide the required data processing function and/or networking functions so that the DTE which the adapter attaches to the network can be designed independently of the requirement for information transmission on the network. As a consequence, the ring adapter performs ring adapter functions to be discussed hereinafter which enable the free movement of data on the ring without impacting the design of the data terminal equipment. The structure and operation of the ring adapters are identical, therefore, the description of the segmented communications adapter subsystem of the present invention (to be given hereinafter) is applicable to all the adapters used in this communications network.

Still referring to FIG. 1 for purposes of description, each ring adapter and its connected DTE is referred to as a station. For example, station 1 includes data terminal 12 and ring attachment or adapter 18. Likewise, station 2 includes data terminal 14 and ring adapter 20 and so forth. Even though the ring adapter is shown as a separate unit from the data terminal equipment in FIG. 1, in a practical system, the adapter is plugged into an expansion slot in the housing of the DTE or other unit which it connects to the ring. For example, one of the IBM token ring adapter cards which embodies the teachings of the present invention plugs into an IBM PC expansion slot and interconnects the PC to the communications media.

Figure 2:
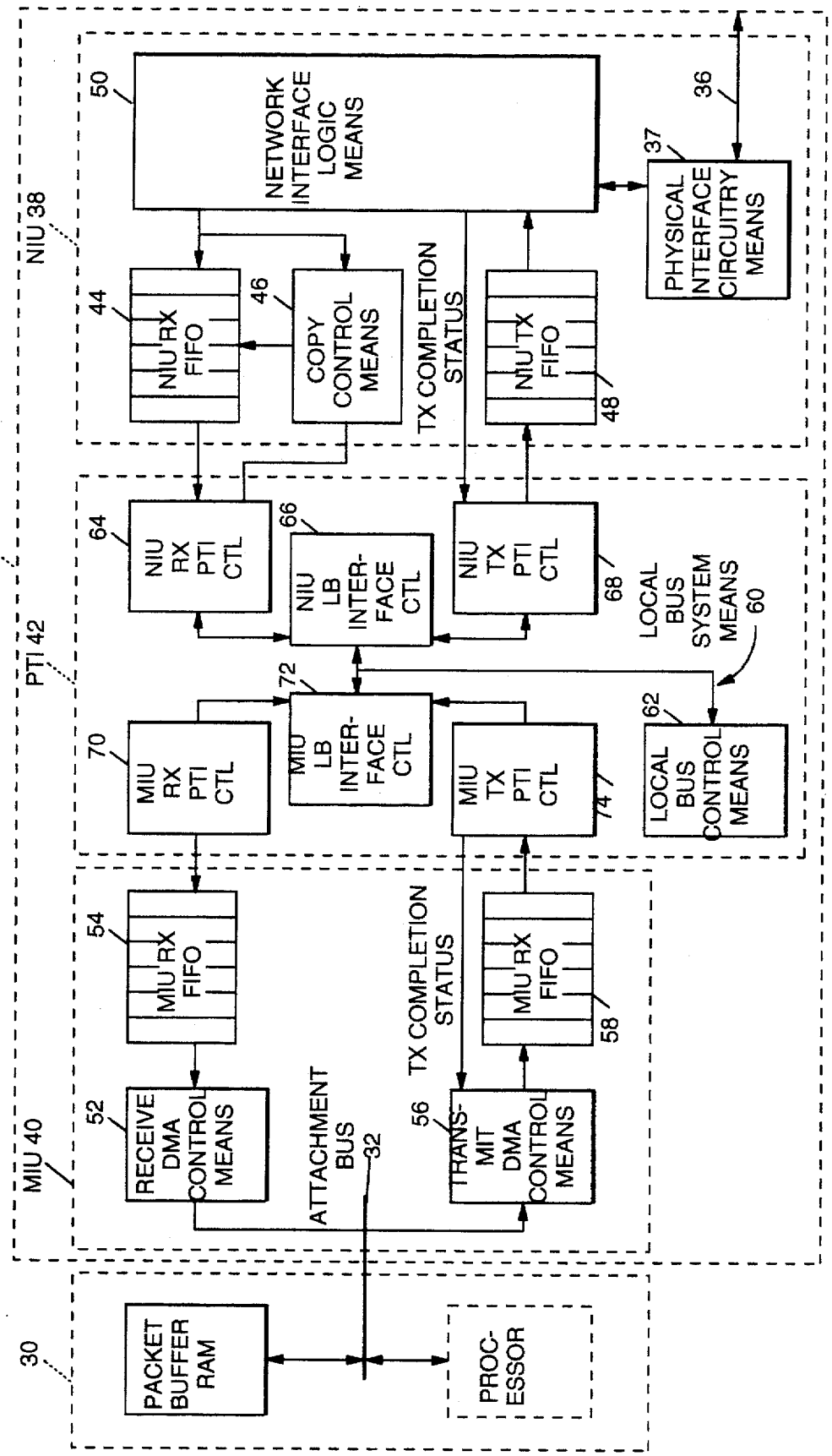
FIG. 2 shows a functional block diagram of the segmented adapter according to the teachings of the present invention.

FIG. 2 shows a functional block diagram of a station in FIG. 1. The stations are functionally similar and, hence, the description in FIG. 2 is intended to cover the other stations. The station is comprised of a computer system 30 or the like interconnected through the attachment bus 32 to segmented communications adapter subsystem 34 of the present invention. The segmented communications adapter subsystem 34, in turn, is connected via the physical interface circuitry means 37 to transmission media 10 (not shown). The network attachment means 37 may include conventional units such as transformers, cables, etc., which are used to attach the physical interface circuit means 37 to the transmission media 10.

Still referring to FIG. 2, the segmented communications adapter subsystem 34 includes a network interface unit (NIU) 38, machine interface unit (MIU) 40, and packet transfer interface (PTI) 42. Even though the subsystems 38, 40 and 42 and their respective components (to be described subsequently) are shown as separate blocks in FIG. 2, in reality all components may be integrated into a single chip or a plurality of chips depending on the design selection made by the designer. This being the case, the showing of the adapter as a separate components or blocks are for purposes of describing the invention only, and does not limit the scope or spirit of the invention. Furthermore, it should be noted that by partitioning the total adapter design into multiple units, increases the flexibility of the design. The network interface unit contains the attachment interface to the communications network and it is communications protocol specific (CPS) and it is computing machine attachment bus generic. Likewise, the machine interface unit contains the attachment interface to the computing machine attachment bus and it is protocol generic and it is computing machine attachment bus specific.

Still referring to FIG. 2, the network interface unit is the entity that provides the attachment between the PTI and the network. The NIU includes Network Interface Unit receive first-in, first-out (NIU Rx FIFO) buffer means 44, copy control means 46, network interface unit transmit, first-in, first-out (NIU Tx FIFO) buffer 48, physical interface circuit means 37, network interface logic means 50 and network attachment means 36. The named components of the NIU are interconnected as shown in the figure. The functions typically performed by the NIU include: latency buffering (first-in/first-out buffer) sufficient to handle the access latency associated with the local interface bus; network access acquisition function for transmit operations, status collection and reporting for network associated and NIU internal error conditions; copying via copy control means 46, of frames which are transmitted to the particular station which the adapter subsystem connects to the network; serializing/deserializing; CRC generation and checking; network physical attachment function and read/write registers containing control points. The function described relative to the NIU so far are standard and, as such, a more detailed description will not be given.

In addition to buffering packet data, the FIFO in the NIU provides the appropriate means for maintaining control information necessary to successfully deliver packets to/from the network. This control information is typically carried by dedicated signals in the FIFO. For example, the FIFO circuitry maintains a record of frame boundaries.

According to the teachings of the present invention, the PTI unit 42 including the MIU RX PTI CTL; NIU RX PTI CTL; etc., effectively take the control information and data that passes through the FIFOs and represents this information on the local bus (LB) in a PTI (Packet Transfer interface) stream. The PTI protocols used to structure the PTI stream will be described, hereinafter.

The advantages of this are: PTI provides a standard interface which enables the segmented adapter to allows mixing and matching of various MIU and NIU implementations. PTI reduces the number of I/O signals required to pass the control and data signals. Multiple channels can be supported without increasing the number of I/O pins. The local bus is usable for other purposes, such as supporting a dedicated microprocessor.

Still referring to FIG. 2, the machine interface unit (MIU) 40 includes receive DMA control means 52, machine interface unit receive first-in/first-out (MIU Rx FIFO) buffer 54, transmits DMA control means 56 and machine interface unit transmit first-in first-out (MIU Tx FIFO) buffer 58. The functions typically performed by the MIU include: latency buffering sufficient to handle the access latency associated with the machine attachment interface bus 32; data transfer facilities on the machine attachment interface bus; bus attachment associated error status collection and reporting; machine presentation of interrupts to the attaching machine; facilities to initialize and control the adapter.

Still referring to FIG. 2, the packet transfer interface (PTI) system 42 includes a local bus system means 60, local bus control means 62, network interface unit receive packet transfer interface control (NIU Rx PTI CTRL) means 64, network interface unit local bus interface control (NIU LB INTERFACE CTRL) means 66, network interface unit transmit packet transfer interface control (NIU TX PTI CTRL) means 68, machine interface unit receive packet transfer interface control (MIU RX PTI CTRL) means 70, machine interface unit local bus interface control (MIU LB INTERFACE CTRL) means 72 and machine interface unit transmit packet transfer interface control (MIU TX PTI CTRL) means 74. The respective components are interconnected as shown in FIG. 2. The named components are arranged to form multiple channels across the local bus system means 60. In the preferred embodiment of the invention, a receive channel is formed by components 64, 66, 72 and 70. Likewise, a transmit channel is formed by components 66, 68, 72 and 74. It should be noted that even though only one transmit channel and one receive channel is shown in FIG. 2, it is well within the skill of one skilled in the art to provide multiple receive channels and/or multiple transmit channels across the single local bus means 60 and any such multiple channels fall within the scope of the present invention.

Still referring to FIG. 2, the local bus system means 60 provides the physical transmission media interconnecting MIU LB INTERFACE CTL 72 and NIU LB INTERFACE CTL 66. The local bus control means 62 arbitrates between request signals from the NIU 38 and the MIU 40 and award the bus on a fair basis to one of the bidders. The MIU RX PTI CTL 70 and NIU RX PTI CTL 64 remove/place data from their respective FIFOs and prepare the data to fit the PTI protocols (to be described herein) and deliver the data to the local bus system means 60. Similarly, the MIU TX PTI CTRL 74 and NIU TX PTI CTL 68 process data to fit the PTI protocol in the transmit channel. The NIU LB INTERFACE CTL 66 permits data from the NIU RX PTI CTRL 64 and data from the NIU TX PTI CTRL 68 on the bus. Similarly, MIU LB INTERFACE CTRL 72 allows access of either the MIU RX PTI CTL 70 or MIU TX PTI CTL 74 onto the local bus system means 60. Before discussing details of an implementation of each of the components in the PTI 42, a summary and overview of the interconnecting functions performed by the PTI will be given.

The PTI 42 (FIG. 2) uses data and control type transfer, call commands, integrated into a single data stream to transfer network frames to host system 30. The transfer is done at media speed. In order to distinguish data and control transfers, a special data-modifier signal, referred to as the command signal, is provided on the local bus system means 60 when a command is on the integrated data bus (to be described hereinafter). The data bus (to be described hereinafter) carries an integrated frame called a PTI frame (to be described hereinafter) or a single command (details to be given hereinafter) on the bus. The command signal is driven by the same bus participant that drives the bus data signals and has the same timing as the bus data signals. The timing signals on the bus are conventional type memory timing signals and, as such, details of these signals will not be addressed hereinafter.

The PTI protocol according to the teachings of the present invention specifies a plurality of different types of command words which are used to indicate various control information. The data bits may be encoded to indicate the type of command being transferred during command transfer. As stated previously, the PTI 42 allows the transfer of communication packets between the NIU 38 and MIU 40. The two entities are interconnected by the PTI. As stated above, there are actually two different complementary transfer interfaces, one for transmit and one for receive.

Turning to FIG. 16 for the moment, a standard token ring frame structure according to the IEEE 802.5 Committee for Local Area Network is shown. The frame structure is used for shuttling information on a token ring network such as the one shown in FIG. 1. The frame format includes a start delimiter (SD), access controlled (AC) field, frame controlled (FC) field, destination address (DA) field, source address (SA) field, information field, frame check sequence (FCS), ending delimiter (ED) field and frame status (FS) field. This figure shows the frame format which is inserted in NIU RX FIFO 44 (FIG. 2). The function of the receive channel of the PTI 42 is to remove that frame and present it to the packet buffer RAM of system 30.

To do this, the receive channel, in particular NIU RX PTI CTRL 64, generates the respective commands and provides a PTI frame structure such as the one shown in FIG. 14. The frame structure in FIG. 14 includes the standard token ring frame format striped of fields necessary for transmission on the token ring but not required in higher network layers and commands (CD) interspersed within the standard token ring frame. It should be noted that, except for the start of frame (SOF) and end of frame (EOF) commands, none or all of the commands shown in FIG. 14 are generated and inserted into a frame received from the network. As stated above, the non-essential fields are removed from the token ring frame. The integrated frame is transmitted on the local bus system means 60. The insertion of commands except for the SOF and EOF commands are strictly dependent on the control information which is in either the RX FIFO or TX FIFO, as the case may be. The status information (STA) is transmitted after every frame on the bus.

Turning to FIG. 15 for the moment, the PTI command structure is shown. In the preferred embodiment of this invention, the command structure has sixteen bits (two bytes wide). The first four high order bits (15–12), of the command structure, indicate that the frame is a command and the last eleven low order bits (11–0) indicate the attribute. As used in this specification, attributes means a type of command which is transmitted across the bus. As will be explained in more detail below there is a data/command port register in the NIU and a data/command port register and status port register in the MIU for each transmit or receive channel. The port registers are implemented as conventional memory mapped input/output (MMIO) read/write addressable registers on the local bus system means 60 (FIG. 2). Therefore, in order to accomplish a PTI command or data transfer, one of the two units (the NIU or the MIU) arbitrates for the local bus in order to gain control of the bus as a bus master. The same unit having control of the bus performs one or more conventional read or write cycle to the other units data/command register or status register. The PTI interface specifies the type of commands and sequence of commands and data transfer for successful transfer of a complete packet. The sequence of commands, etc., will be described below when details of the respective components of PTI 40 are given. For the moment, we will now turn to the PTI commands and protocols provided to move frees at media speed across the local bus system means 60.

Figure 25:
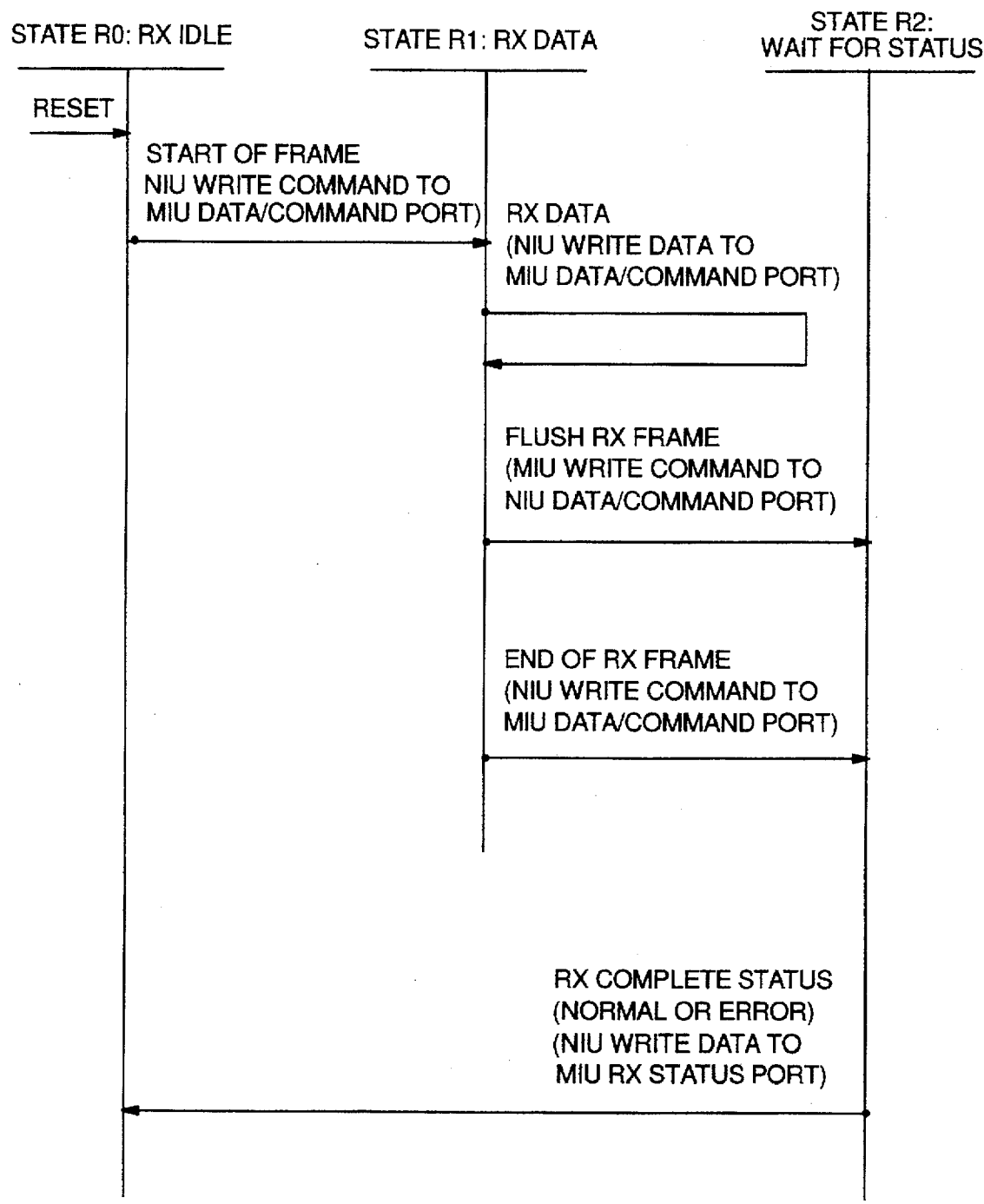
FIG. 25 shows a receive state machine for primary commands on the PTI.
Figure 26:
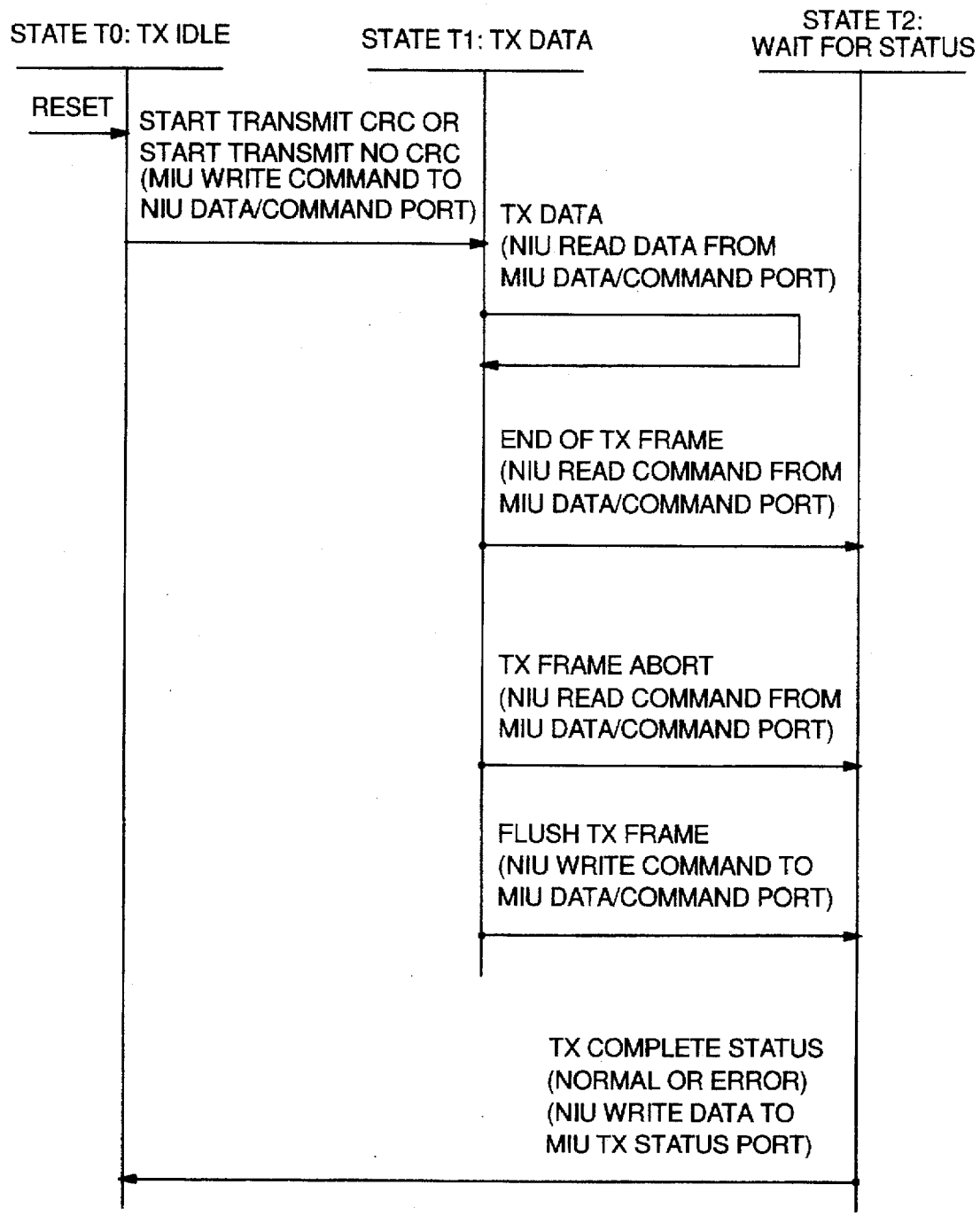
FIG. 26 shows a transmit state machine for primary commands on the PTI.

The sequence in which various commands and data are transferred across the Local Bus is part of the present invention and is important to the correct operation of PTI. The pseudo-state machines shown in FIGS. 25 and 26 show the allowable sequence of data and primary command transfers for receive and transmit, respectively. The optional packet start of field marking commands and attribute and status conveying commands are not explicitly shown in these diagrams, but are understood to occur in correct sequence relative to the packet data. The asynchronous command transfers also do not appear in these figures, as these commands have no fixed relationship to packets being transferred and may be transferred at any time.

Looking at FIG. 25, it is evident that after a reset condition, the receive PTI interface is in an "idle" condition. At this point, the only allowable primary transfer is the Start of Frame Command, which is written by the NIU (the NIU is the local bus master for this transfer) to the MIU's Command/Data port. The NIU uses the Start of Frame Command to indicate to the MIU that the transfer of a packet has started. Once the Start of Frame transfer occurs, the receive PTI interface enters the "RX Data" state. Packet data is then transferred in sequence by the NIU to the MIU, with packet start of field marking commands transferred at the appropriate time. If the MIU experiences some condition whereby the transfer of the receive packet needs to be aborted (such as an overrun condition), then the MIU may write a Flush Receive command the NIU's command/data port, which causes to the interface to proceed to the "Wait for Status" state. However, normally, a complete packet is transferred, the NIU transfers an End of Frame command and the interface enters the "Wait for Status" state. Once in this state, the only allowable primary transfer is a "Receive Complete Status" transfer, whereby the NIU writes packet completion status to the MIU's receive status port. This causes the receive PTI interface to enter the "Idle" state, and completes the transfer of the packet.

Looking at FIG. 26, the transmit PTI interface operates in a similar manner. The MIU writes a Start Transmit Frame CRC or Start Transmit Frame No CRC command to the NIU's command/data port to signal to the NIU that the MIU has a frame ready to be transmitted. The NIU then reads the frame from the MIU's command/data port until an End of Transmit Frame command (normal sequence) or Transmit Frame Abort command (error sequence) is provided by the MIU, which is then followed by Transmit Completion Status being written from the NIU to the MIU. When the transmit PTI interface is in the "TX Data" state, the NIU may abort the packet transfer by writing a "Flush Transmit Frame" command to the MIU.

FIGS. 19A, 19B and 19C show a list of PTI transfers for receive primary, receive optional and receive asynchronous.

The primary are required for frame/packet transfer. The optional are additional commands in stream optional frame field markers or information conveying commands. The asynchronous transfers are not associated with a frame, and may be transferred at any time.

FIGS. 20A, 20B and 20C show a listing of transfers for transmit primary, transmit optional and transmit asynchronous. In the FIGS. 19A, 19B, 19C, 20A, 20B and 20C, the column labeled "TRANSFER" contain the name of the transfer (example: Data Transfer, Completion Status and so forth). The "Command/Data" column indicates whether the transfer is a command transfer or data transfer (by definition, a command transfer is one in which the "Command" signal on a selected line of the PTI is active indicating a "Command" is on the local interface bus). The "CODE" column indicates an example of encoding for the various commands. The "BUS MASTER" column indicates which party (NIU or MIU) is a bus master when the transfer occurs. The "READ/WRITE" column indicates the state of the read/write signal on the local interface bus. The "Slave Target Register" indicates the target (source or sink) of the transfer in the slave device. The slave device is always the NIU for transfers where the MIU is the bus master, and is always the MIU for transfers where the NIU is the bus master.

A description of the PTI receive interface follows: the PTI interface generates start frame (SOF) and end of frame (EOF) commands, as well as other necessary commands required to transfer the received frame. In order to transfer a received frame from the network across the PTI, the NIU gains control of the local bus using the technique described above and writes a SOF command to the machine interface units command/data port. Then, receive packet data bytes are written, in sequence as received from the communication system to the same command/data port. Commands which mark specific packet data fields (i.e., address, CRC, etc.) may also be transferred. Note that at any time during this process the NIU may temporarily suspend PTI activity by relinquishing control of the local bus system means 60. Once the final data item in the receive packet has been transferred, the NIU writes an EOF command. Finally, receive packet status is written to the machine interface units status port in order to complete the transfer of a complete packet. In the above description for transferring a receive packet from the network, the NIU's command data port was not mentioned. The machine interface unit uses this port to transfer certain control information, such as enable or disable receive channel or abort reception. In other words, the NIU command data port is reserved for receiving control information back from the MIU unit.

The PTI transmit interface operates as follows: again, start of frame (SOF) and end of frame (EOF) commands are provided by the PTI interface MIU. Transfer of a complete packet begins when the MIU signals the NIU that there is a frame to be transmitted, gaining control of the local bus and writing a SOF command to the NIU's command data port. Then, the NIU gains control of the local bus system means 60 and performs successive read cycles to the machine interface unit command/data port. With each read cycle to the command/data port, the machine interface unit presents new packet data to be transmitted in the order to be transmitted. Once the last transmit packet data item has been transferred, the machine interface presents a EOF command on the next read to the command/data port, indicating that the packet has been transferred. Finally, once a packet has been transmitted, the NIU writes transmit completion status to the machine interface unit status port.

A detailed implementation for the PTI 42 is set forth below and described relative to FIGS. 3–26.

FIG. 3 shows the details for the local bus system means 60. In one embodiment, the local bus is a conventional address/data synchronous bus. For purposes of discussion, the NIU LB INTERFACE CTRL 66 is shown in the NIU subsystem while MIU LB INTERFACE CTRL 72 is shown in the MIU subsystem. The nomenclature used in this figure and throughout this application is that data lines, control lines, command lines, etc., uses initials of the unit to which they relate. This being the case, LB meaning Local Bus, is used in all lines forming part of the local bus. For example, the LB_ADDRESS indicates an address bus in the local bus system. The plus (+) or minus (−) nomenclature indicates the state of the electrical signal when the line is active. The number in brackets indicates the number of lines in the bus. In addition, like numerals are used to identify common elements in the drawings. With this nomenclature and referring to FIG. 3, there are sixteen lines in the address bus, seventeen lines in the command/data bus, the minus LB bus active line indicates whether a command or data is on the bus. The plus LB read/write line indicates whether its a write cycle or a read cycle on the bus. The +LB_16/−8 signal indicates whether sixteen or 8 data bits are being transferred during any given bus transfer cycle. There is a plus reset line and there is a plus clock line. In the present embodiment, the clock line provides the time base for the synchronous bus and each transfer on the local bus occurs in one bus clock cycle. The local bus control means 62 has a local bus arbitration unit 62' and a clock source generating unit 62". The local bus arbitration unit 62, receives arbitration requests from the MIU over the MIU LB request line and from the NIU over the NIU LB request line. The arbitration unit uses any of the well-known conventional techniques and circuitry to award control of the bus to the MIU 40 over the MIU LB Grant Line or to NIU 38 over the NIU LB Grant Line.

FIG. 4 shows the network interface unit 38 (FIG. 3) and components from the PTI 42 (FIG. 2). Due to the logical relationship, NIU' 38' represents the combination. Referring to FIG. 2 for the moment, it should be noted that the interconnections (hereinafter called interfaces) between the components are shown as single lines. This was done to make FIG. 2 less complex and easier to understand. In reality, the interfaces include several busses, simplex lines, etc., carrying data and/or commands and/or control signals. In FIG. 4 and subsequent figures to be described hereinafter, the details of the interfaces and control lines are given. The names associated with each line or group of lines represent the signal which is carried on that line. Thus, a line labeled Request suggests that request signal is carried on it. Similarly, a line labeled Grant indicates a grant signal is carried on it and so forth. The mathematical indicia (+, −) represents active signal polarities. Regarding nomenclature, NT represents NIU Transmit and indicates the signal relates to the transmit channel in the NIU network, NR represents the NIU receive and indicates the signal relates to the receive channel in the NIU. MT represents MIU Transmit (TX) and relates to signals in the transmit channel in the MIU. MR represents MIU Receive (RX) and relates to receive channels in the MIU. Finally, where a bus is involved, the bracketed number indicates the number of lines or width of the bus. Also, where several signals interconnect units, only a single line is used with respective signal names and an arrow head on the lines to indicate the direction of the signal flow.

Still referring to FIG. 4, alphabetical characters A, B, C, D, E, F and G identify interfaces between respective units. Thus, interface A represents the local bus (LB), interface B represents the lines interconnecting NIU LB INTERFACE CTRL 66 and NIU RX PTI CTL 64 and so forth. The command/data port register 64' is provided in the NIU RX PTI CTL 64. Similarly, command/data port register 68' is provided in the NIU TX PTI CTL 68. By way of example, the address for command/data port register 64' is h'FF00' while the address for command/data port register 68' is h'FF04'. Of course, other values can be used to identify these registers without deviating from the teachings of the present invention.

The purpose of these registers 64' and 68' is to enable the transmission of data between the MIU and the NIU. Their utilization and function have already been described above and will not be repeated here. As stated previously, the names associated with each signal line indicate the signal which the line carries. In an attempt to make the drawings less cluttered, abbreviations are used on each line. As an example, Table 1 below gives the abbreviation and full name for the lines in interface D. Basically the table shows the abbreviations as they appear in FIG. 4 and the full names of each abbreviation. It is believed that the other abbreviations between the respective units are self-explanatory and further explanation of the abbreviation will not be given.

TABLE 1

| ABBREVIATIONS | FULL NAMES |
| --- | --- |
| 1) +NR_FIFO_XFER_RDY | +NIU RECEIVE FIFO TRANSFER READY |
| 2) +NR_NEXT_XFER | +NIU RECEIVE PRESENT NEXT TRANSFER |
| 3) +NR_FIFO_DATA | +NIU RECEIVE FIFO DATA BITS 15-0 |
| 4) +NR_FIFO_EMPTY | +NIU RECEIVE FIFO EMPTY |
| 5) +NR_FIRST | +NIU RECEIVE FIRST DATA TRANSFER IN PACKET |
| 6) +NR_BYTE | +NIU RECEIVE BYTE DATA |

TABLE 1-continued

| ABBREVIATIONS | FULL NAMES |
| --- | --- |
| 7) +NR_LAST 4 | TRANSFER (NOT 16 BIT TRANSFER) +NIU RECEIVE 4TH DATA BYTE FROM LAST IN PACKET |
| 8) +NR_COMP_STAT | +NIU RECEIVE COMPLETION STATUS TRANSFER |

Figure 5A:
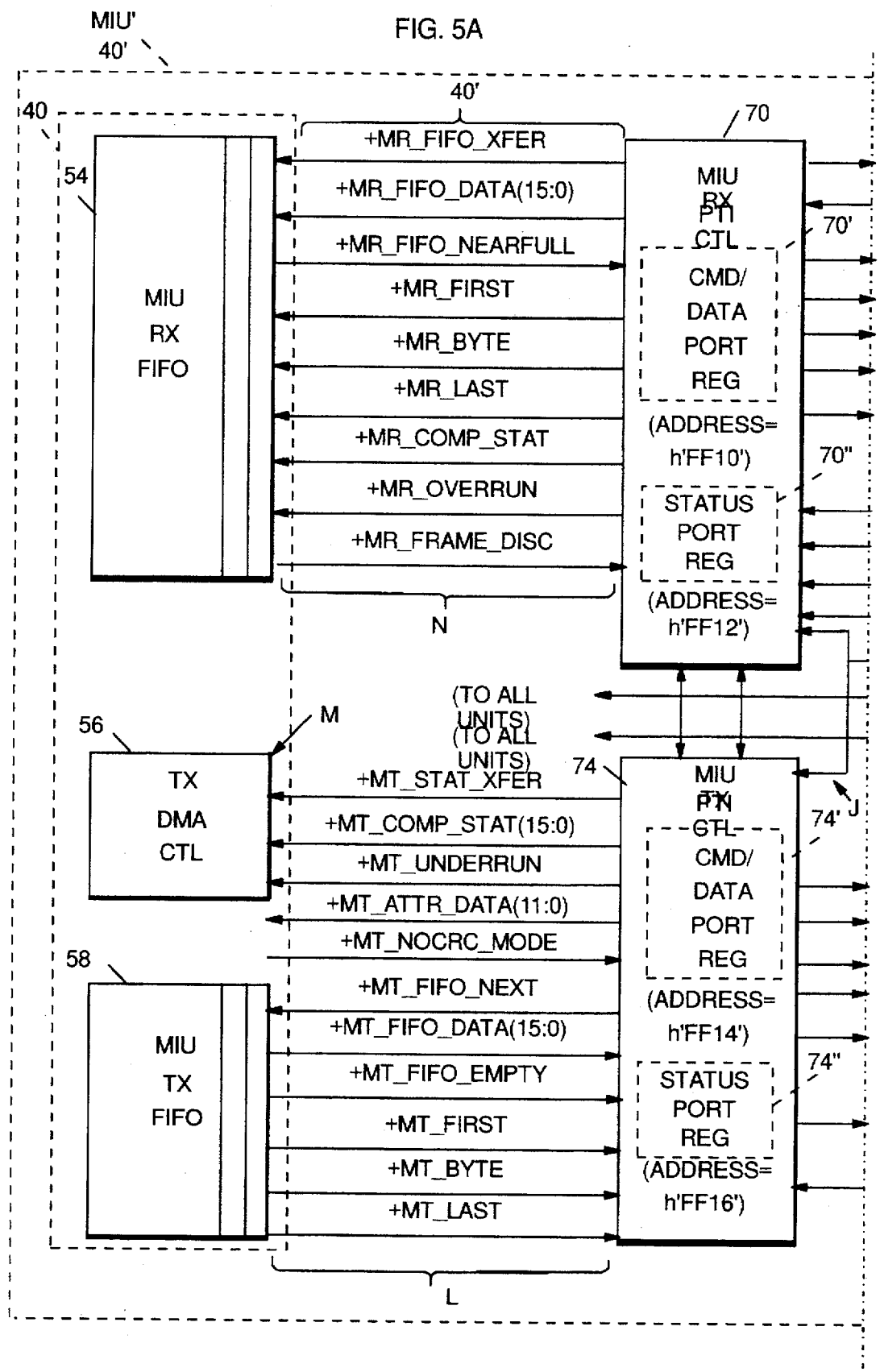
Figure 5:
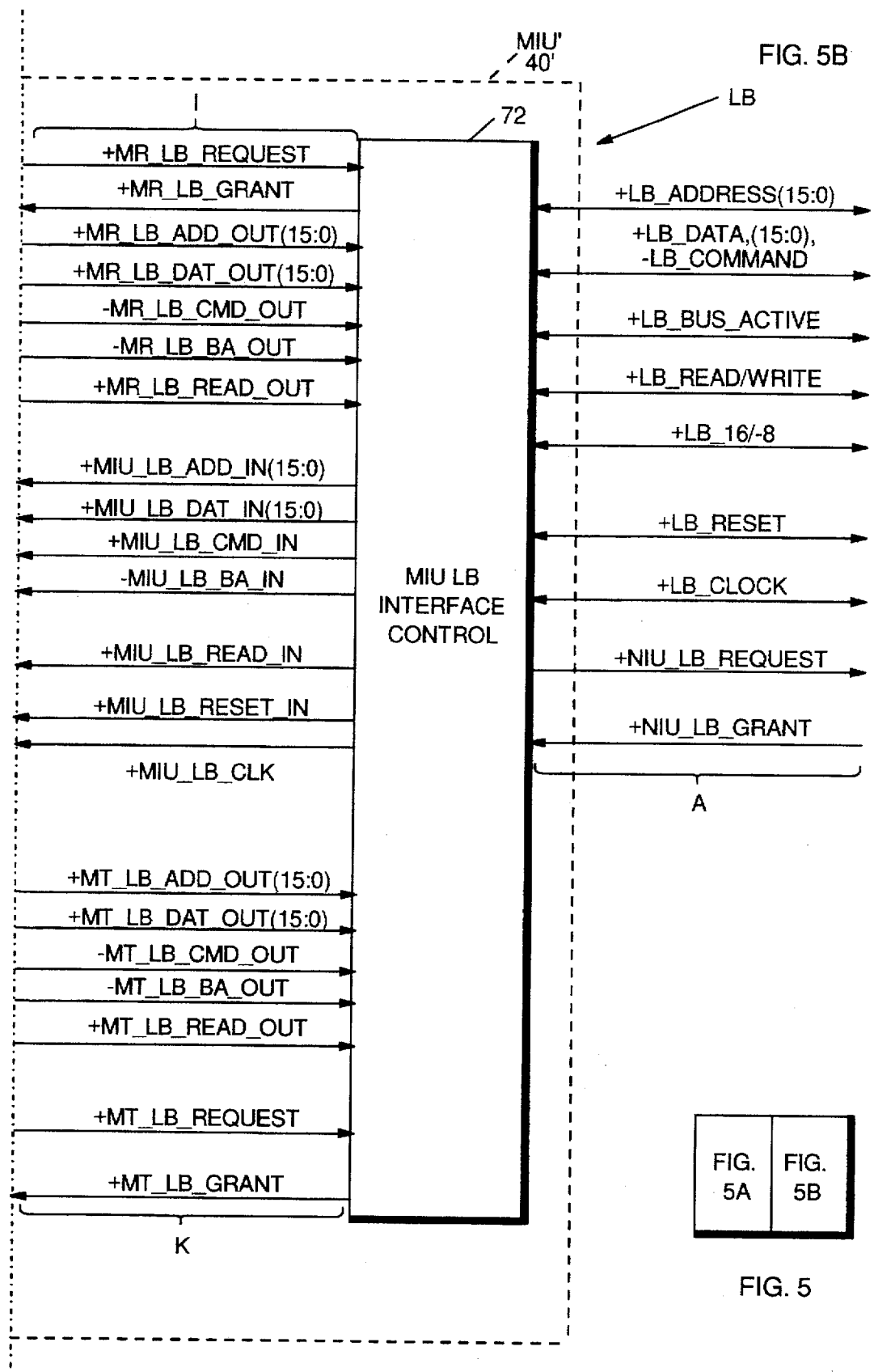

FIG. 5 shows the MIU 40 together with components from the PTI 42 the combination of which is referred to as MIU' 40'. MIU' 40' is interconnected to NIU' 38' by interface A. Other interfaces coupling the respective units are I, J, K, L, M and N. Regarding nomenclature, MR represents MIU Receive which indicates those signals relative to the MIU' receiving information, MT represents a machine transmit and relates to signals being transmitted from the MIU' to the NIU'. The MIU RX PTI CTL 70 is provided with command/data port register 70' and status port register 70', Exemplary addresses for the command/data port reg. and status port reg. 70" are h'FF10' and h'FF12', respectively. Of course, other addresses can be used without deviating from the scope and spirit of the present invention. Similarly, the MIU TX PTI CTL 74 is provided with command/data port reg. 74' and status port reg. 74". The exemplary addresses for the command/data port reg. 74' and status port reg. 74" are h'FF14 and h'FF16', respectively. These addresses too are exemplary and others may be selected without deviating from the scope of the present invention. As described above, the command data port reg. 70', status port reg. 70", command/data port reg. 74' and status port reg. 74" are used in the receive and transmission of data between the MIU' 40' and NIU' 38'.

FIG. 6, comprising FIGS. 6A and 6B, shows a circuit block diagram for the NIU LB INTERFACE CTRL 66. The function of the NIU LB INTERFACE CTRL 66 is to arbitrate requests from NIU RX PTI CTL 64 and NIU TX CTL 68 and give the use of the local bus to one of these units. As a consequence, the NIU LB INTERFACE CTRL 66 (FIG. 6) includes the NIU LB INTERFACE CTRL arbitration and steering logic means 80 which receive request signals and output control signals and grant signals as shown in FIG. 6. In addition to providing the arbitration function, the NIU LB INTERFACE CTRL 66 provides the circuit which drives or powers the signal on the local bus. Also, the signal lines from the NIU RX PTI CTL 64 and NIU TX PTI CTL 68 are correlated through the NIU LB INTERFACE CTRL 66. To carry out these functions, a plurality of drivers, receivers and multiplexers (data MUX) are interconnected as shown in FIG. 6). The signals which are multiplexed and output from the NIU LB INTERFACE CTRL 66 are clearly marked on the respective lines of FIG. 6 and further description will not be given.

FIG. 7, comprising FIGS. 7A and 7B, shows a circuit block diagram for the MIU LB INTERFACE CTRL 72. The function provided by the MIU LB INTERFACE CTRL 72 is similar to the function provided by the NIU LB INTERFACE CTRL 66 except that the functions (multiplexing, arbitrating and driving) provided by MIU LB INTERFACE CTRL 72 is done for the Machine Interface Unit located on the left of the local bus (FIG. 2). As a consequence, in FIG. 7 the MIU LB INTERFACE CTRL 72 includes a steering logic means 82 and plurality of drivers, receivers and multiplexers with appropriate signals and direction of signal flow identified. Due to the similarity of MIU LB INTERFACE CTRL 72 with previously described NIU LB INTERFACE CTRL 66, the previously described information is equally applicable to MIU LB INTERFACE CTRL 72 and further description of this unit will not be given.

Figure 8A:
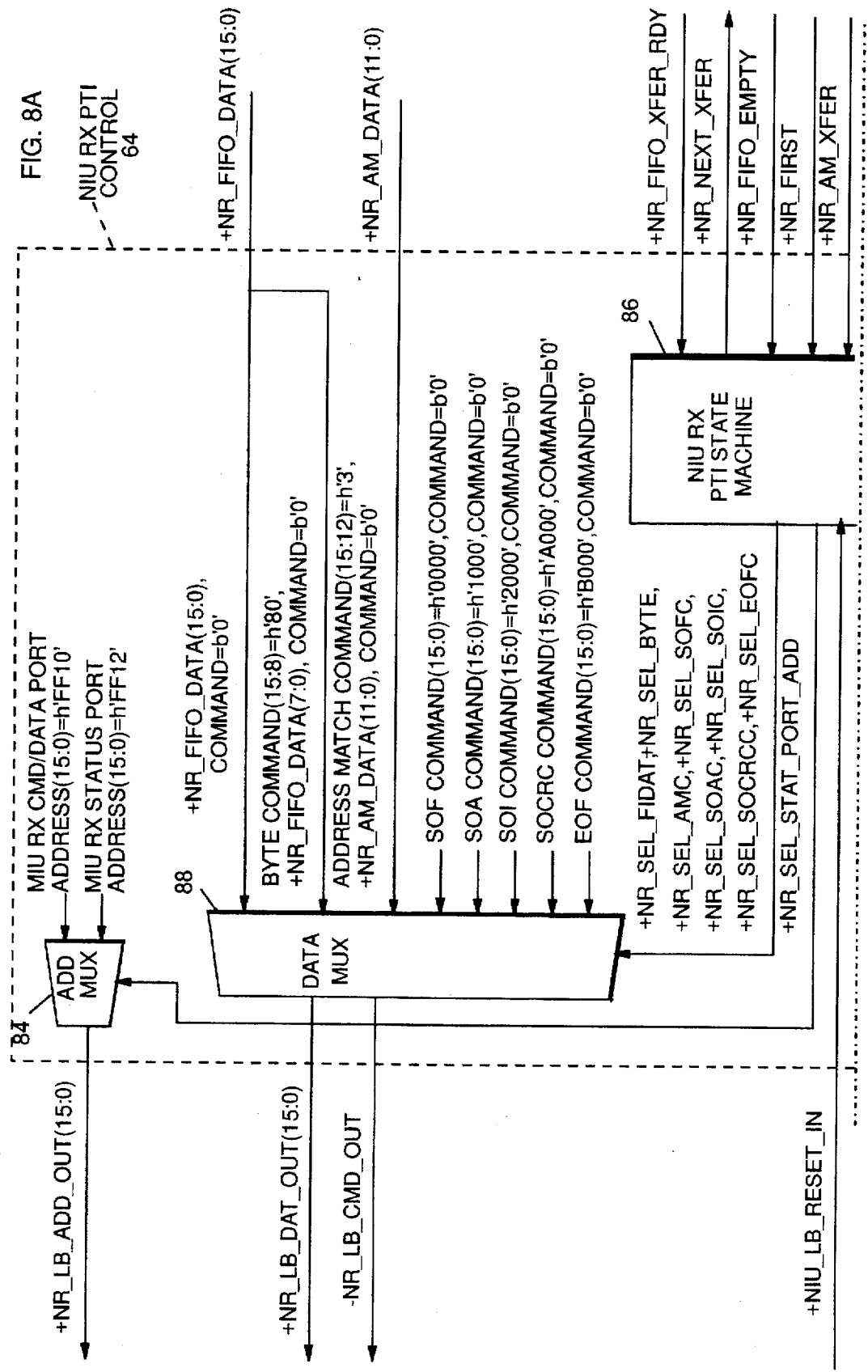
FIGS. 8, 8A and 8B show block diagrams for NIU Rx (Receive) PTI Control.
Figures 8, 8B:
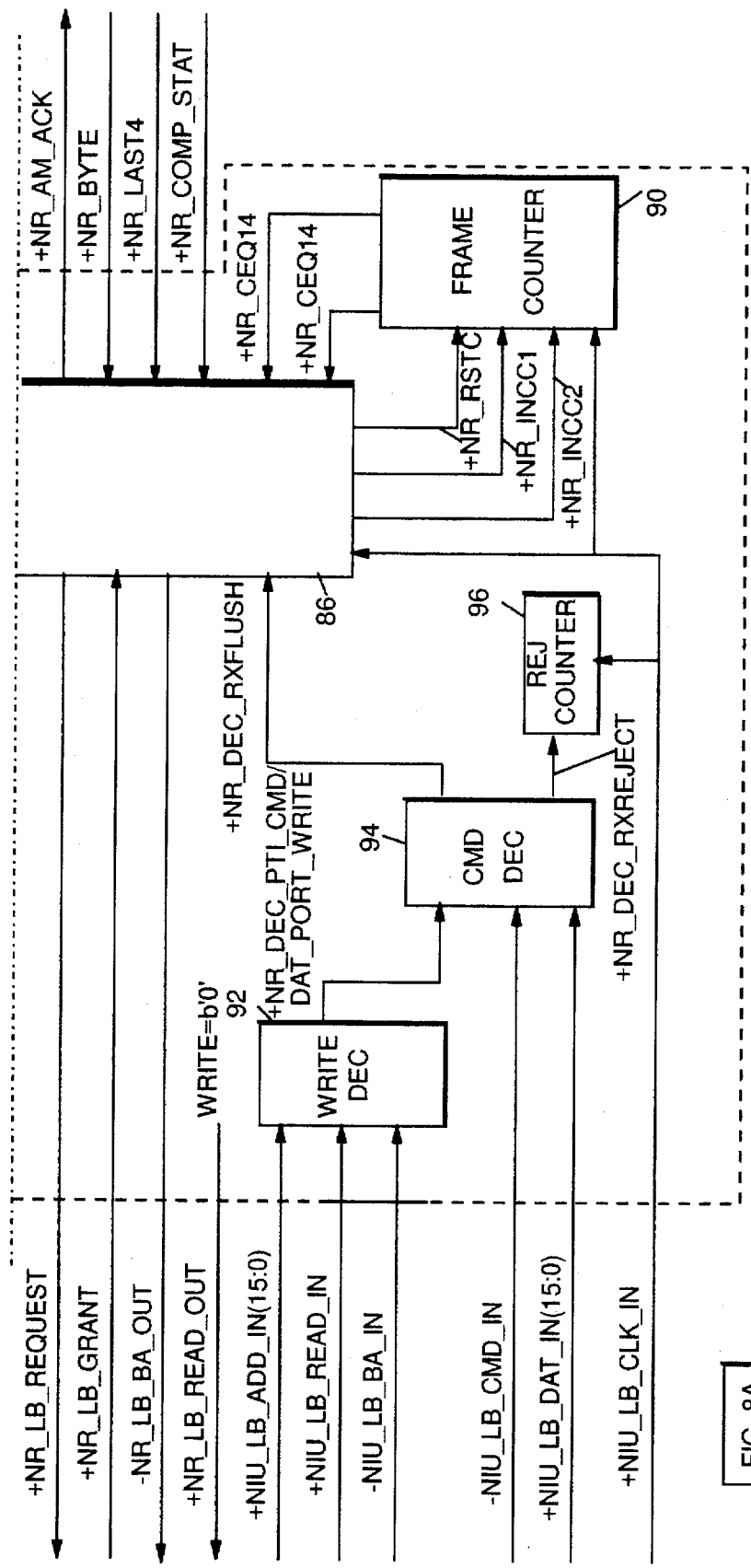

FIG. 8, comprising FIGS. 8A and 8B, shows a logic circuit diagram for the NIU RX PTI CTRL 64. Broadly stated, the function of this unit is to correlate the information in the NIU RX FIFO 44 (FIG. 2) with the PTI bus protocol. The NIU RX PTI CTRL 64 includes address multiplexer (ADD MUX) 84 having a pair of input bus signals from the command/data port address reg. and status port address register and an output labeled network local bus address out (NR LB ADD OUT). As stated before (15:0) indicates a bus 16 bits wide. A control signal labeled "+NR_SELECT_STAT_PORT_ADD" is provided by the NIU RX PTI state machine 86 (details of the state machine will be given subsequently). The state machine, in turn, provides a plurality of select signals to Data MUX 88. The state machine receives and outputs several other types of control signals identified by respective names in the FIG. 8. A frame counter 90 receives control signals from the state machine and outputs control signals to the state machine. In addition, write decoder 92, command decoder 94 and reject counter 96 are connected and the command decoder 94 provides a control signal labeled +NR_DEC_RX_FLUSH to the state machine. In addition to the control signal which the state machine 86 supplies to Data MUX 88, several other command signals are also provided to Data MUX 88. Depending on the state of the state machine, the appropriate command is interspersed with the data onto the integrated local bus (FIG. 2).

Figure 9:
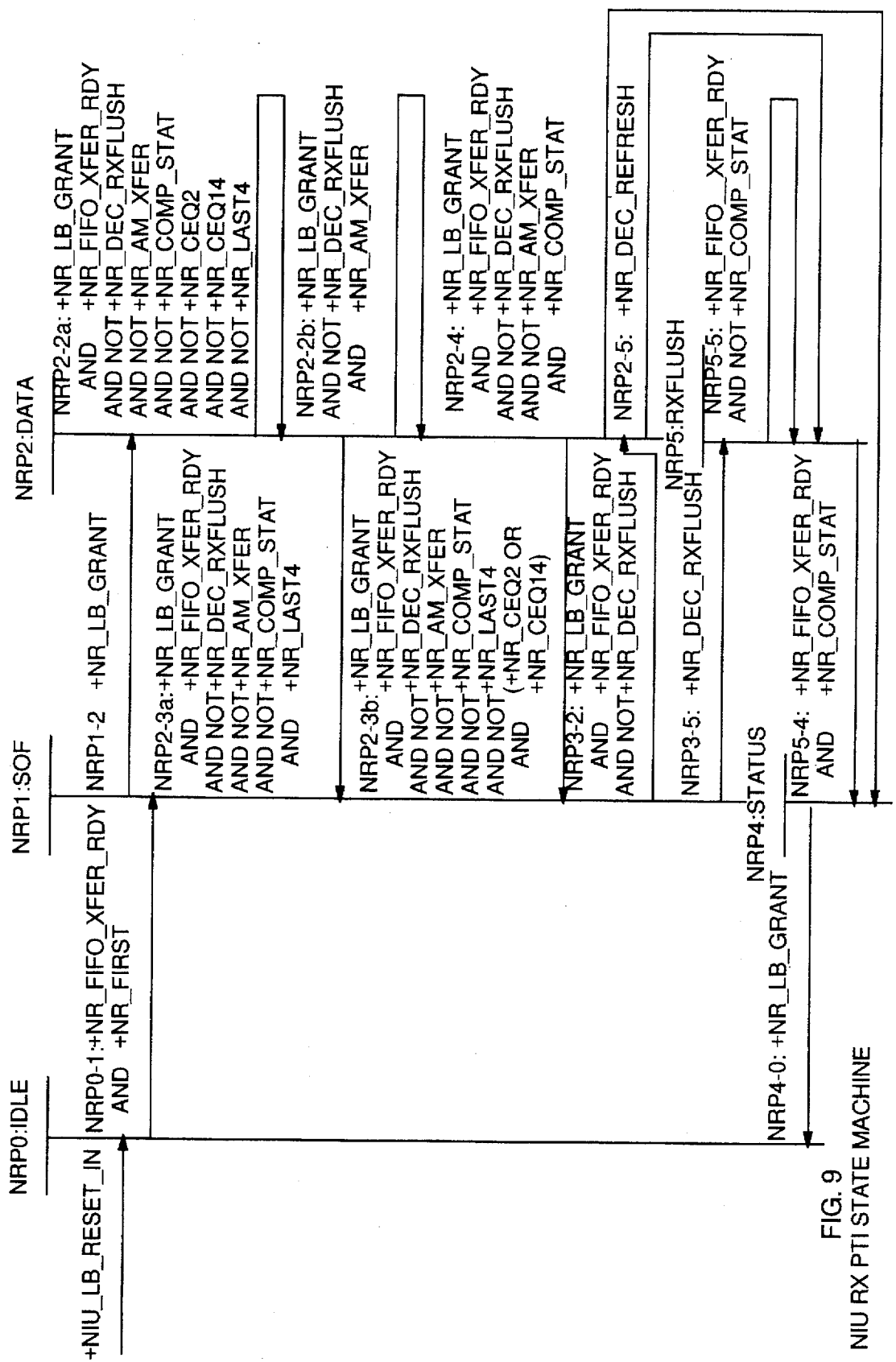
FIG. 9 shows a logic flow diagram for NIU Rx PTI State Machine.

FIG. 9 shows a flow chart or state diagrams of the NIU RX PTI State Machine 86 (FIG. 8A). The state machine has six states (0–5). The flow chart lists the name of the various states and the conditions that cause the state machine to move from one state to the next. The reading of state machine is well within the skill of one skilled in the art; therefore, only the condition which allows the generation of a command will be described as an example of the state machine operation, it being understood that the other functions which is generated by the state machine can be determined from the state machine logic in FIG. 9.

By way of example, the generation and presentation on the local bus of the SOF command will be described. Initially, we imagine that the network is idle, and no frames are in the process of being received by the communications adapter subsystem. Therefore, the NIU RX PTI state machine is in the "Idle" state, designated "NRP0", and all signals on interface D (FIG. 4B) are in their inactive state, except "+NR_FIFO_EMPTY" which is active.

Figure 4B:
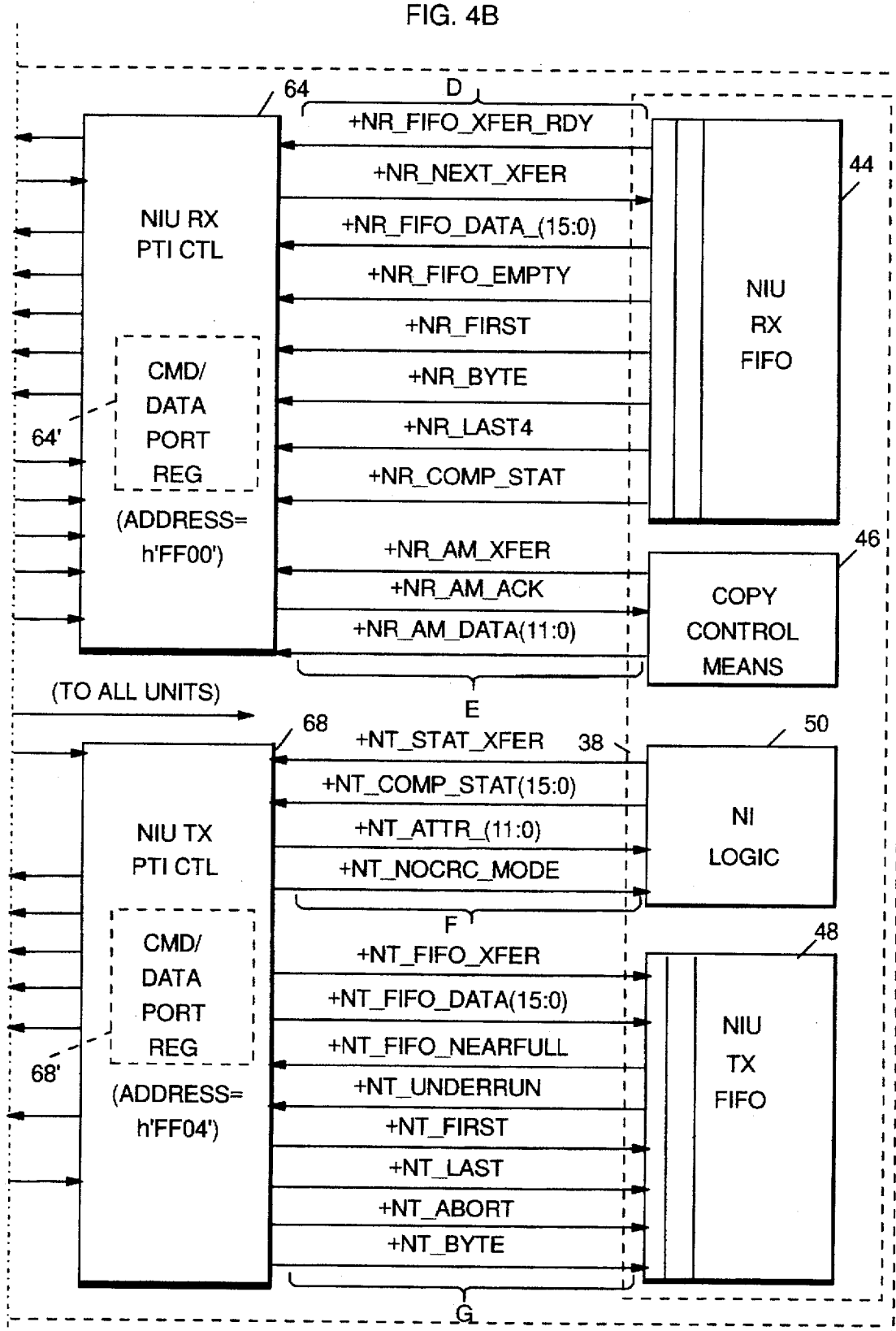

At this point, we imagine that a frame is transmitted by some station on the network which is addressed to the station in question. When the head of the frame arrives at the station, the serial bits are deserialized into bytes as they arrive and are placed in the NIU receive FIFO 44 (FIG. 4B). As the frame bytes are placed in the NIU receive FIFO, the copy control means (46) performs an address "match" against the DA field in the frame in order to determine if the frame should be copied. Since, in this hypothetical case, the frame is addressed to this station, once the DA field is completely received, the copy control means will determine that the frame is to be copied, and indicates this by way of signals to the NIU RX FIFO. At this point, the NIU RX FIFO presents the first two bytes of the frame on interface D (FIG. 4). More specifically, the data is presented on "+NR_FIFO_DATA" (15:0) and both the "+NR_FIFO_XFER_RDY" and "+NR_FIRST" signals are activated to indicate that a data transfer is ready, and that it is the first transfer in the frame.

In response to these signals going active, the NIU RX PTI state machine transitions to state NRP1 SOF (FIG. 9). Once in this state, the following occurs: The "+TR_SEL_SOFC" signal is activated, which causes MUX 88 to gate a SOF command onto the "+NR_LB_DAT_OUT(15:0)" and "−NR_LB_CMD_OUT" signals. The "+NR_SEL_STAT_PROT_ADD" signal remains inactive, so that the MIU RX CMD/data port address is steered out onto the "+NR_LB_ADD_OUT(15:0)" signals. At the same time, the NIU RX PTI state machine requests the local bus by activating the "+NIU_LB_REQUEST" signal. Eventually, units 62' and 82 grant the bus to the NIU RX PTI state machine and signal this by activating "+NR_LB_GRANT". At the same time that "+NR_LB_GRANT" is activated, the NIU RX signals coming into unit 66 are steered out onto the local bus under the control of 80.

Therefore, the SOF and appropriate addresses are presented on the local bus. At the next clock "tick" or cycle, the NIU RX PTI state machine transitions from state NRP1 to NRP2, at which point the SOF command is deselected and no longer driven on the bus.

FIG. 10 gives the listing of signals outputted from the state machine 86 and other NIU RX PTI signals. The named generated signals are listed on the right hand side of the "=" sign and the required logical expressions for generating the named signal are listed on the right hand side of the respective equal signs.

Figure 11B:
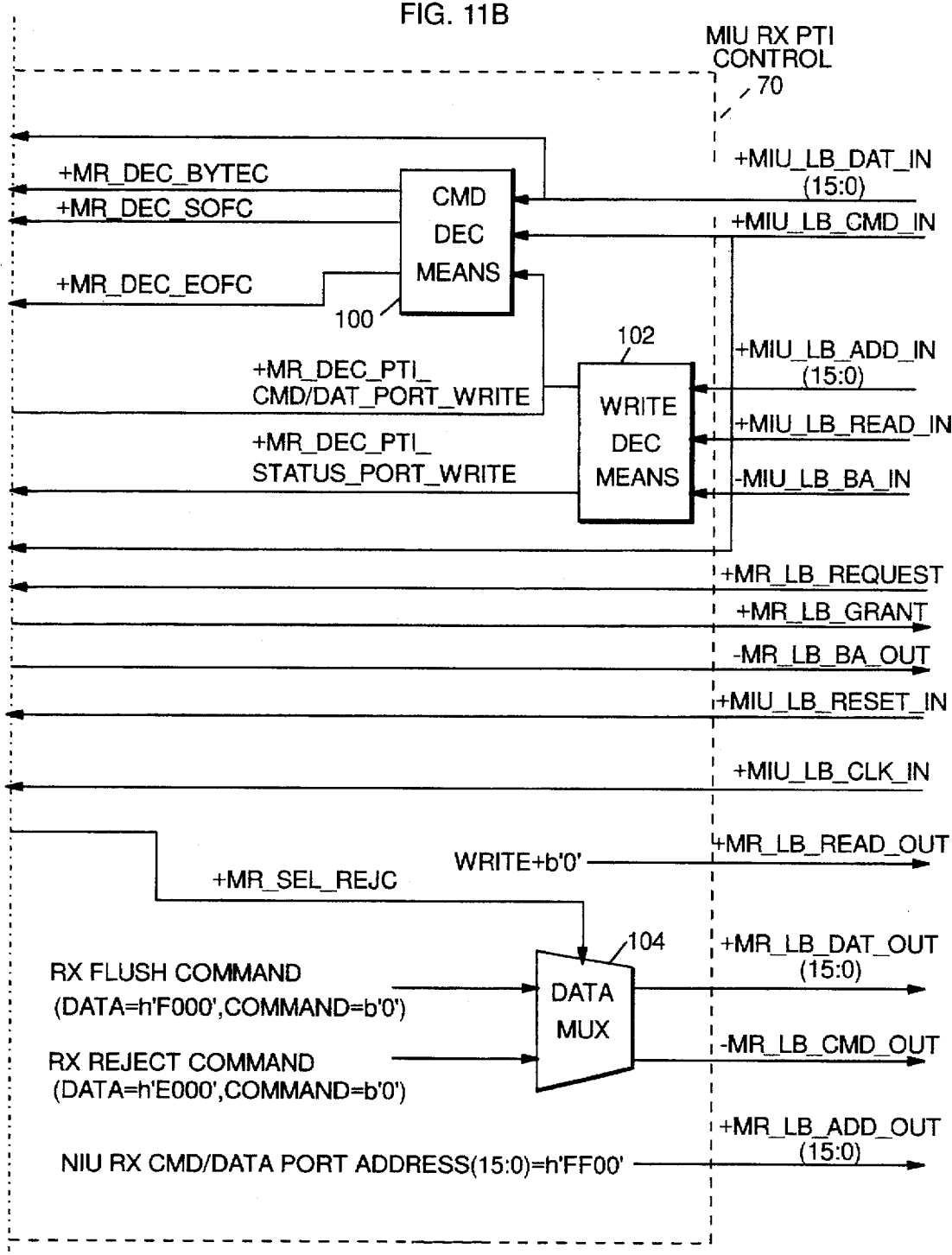

FIG. 11, comprising FIGS. 11A and 11B, shows the MIU RX PTI CTRL 70. The function of the MIU RX PTI CTRL 70 is to provide the interfacing and conversion mechanism between the PTI interface data/control stream and a conventional data stream and control structure carried by the FIFO.

The MIU RX PTI CTRL 70 includes a MIU RX PTI State Machine 98. It is coupled over respective control lines to command decode means 100 and write decode means 102. Both the command decode means 100 and the write decode means 102 are provided with identified input control signals and data signals. An output from the state machine 98 provides control signals to Data MUX 104. The state machine 98 also provides control signals to register 106, byte register 108 and data register 110. A reject register 112 provides an input signal to the state machine 98.

Figure 12:
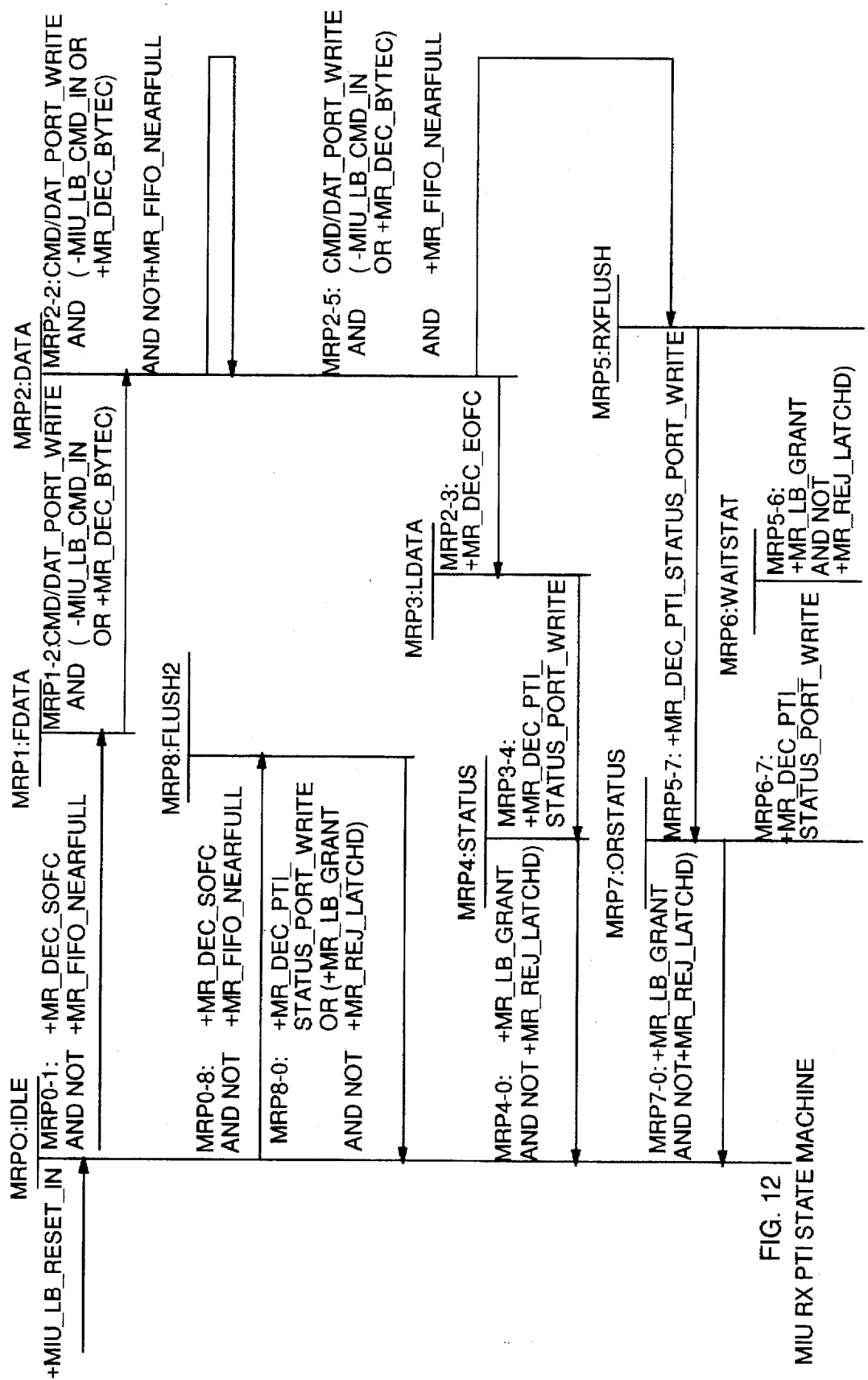
FIG. 12 shows a logic flow diagram for the MIU Rx PTI State Machine.

FIG. 12 shows a flow chart for the state machine 98 (FIG. 11). The state machine has seven states (0–6). As described above, it is well within the skill of the art to read the operation of the state machine from the conditions listed in FIG. 12. For example, the conditions which cause the state machine to go from MRP0:Idle to MRP1:FDATA are: A PTI start of frame command is written to the MIU command/data port by the receive NIU (and thereby decode by 100 and 102), and the MIU receive FIFO has sufficient space in it to contain a minimal frame fragment (i.e., +NR_FIFO_NEAR FULL is not active). Therefore, further discussion of this state machine flow chart will not be given.

FIG. 13 shows a table listing the output signal from the state machine and other MIU RX PTI signals. As before, the signal name is on the left hand side of the chart and the expression on the right hand side of the equal sign indicates the logical function which is performed on respective signals to provide a desired output on the left hand side of the equal sign.

In addition to the components described above, the Receive (RX) channel (FIG. 2) includes NIU RX FIFO 44, MIU RX FIFO 54 and Receive DMA control means 52. The FIFO buffers perform temporary storage functions for data passed to them by network interface logic means 50 and MIU RX PTI CTL 70, respectively. Buffering is required in order to have a place to store received packet bytes when the attachment bus 32 is temporarily unavailable to Receive DMA Control Means 52 in the case of MIU RX FIFO 54 and the Local Bus of Local Bus system means 60 is temporarily unavailable to receive information from NIU RX PTI control 64. In addition, buffering is required to allow the receive DMA control means 52 and the NIU RX PTI control 64 to transfer multiple bytes from their respective FIFO buffers when they are given control of their respective bus. Each of the FIFO buffers also provides empty/full threshold detection signals which is used by the receive DMA means 52 and NIU RX PTI control 64 to determine when to initiate and terminate the packet data transfer. The receive DMA control means 52 pulls packet data bytes out of the MIU RX FIFO 54 and writes them into buffers in the packet buffer RAM using direct memory access (DMA) cycles on the attachment bus 32. As described in detail above, the NIU RX PTI CTL 64 pulls data from FIFO 44 and writes them into MIU RX PTI CTL 70 using the previously-described PTI protocols on the Local Bus. Full threshold exceeded indication signals from the FIFOs 54 and respectively, cause the receive DMA control means 52 and the NIU RX PTI CTL 64 to enter into arbitration for use of their respective busses. Likewise, "empty" threshold exceeded indication signals from FIFOs 44 and 54 cause the receive DMA control means 52 and the NIU RX PTI CTL 64 to terminate transfer of data.

Still referring to FIG. 2, the transmit channel includes transmit DMA control means 56, MIU TX FIFO 58, and NIU TX FIFO 48. Other elements of the transmit channel such as MIU TX PTI CTL 74, NIU TX PTI CTL 68, etc., have already been described above. The transmit FIFOs operate as storage for information passes to them by the transmit DMA control means 56 and the NIU TX PTI CTL 68, respectively. Buffering is required in the transmit channel in order to have a place to source transmit packet bytes when the attachment bus is temporarily unavailable to the transmit DMA control means 56 and the Local Bus of Local Bus control means 62 is not available to the NIU TX PTI CTL 68. In addition, the transmit FIFOs allow the transmit DMA control means 56 and the NIU TX PTI CTL 68 to work more efficiently by transferring multiple bytes during a single ownership of their respective busses. The transmit FIFOs also provide empty/full threshold detection signals which are used by the transmit DMA control means 56 on the NIU TX PTI CTL 68 to initiate and complete packet data transfers.

The transmit DMA control means 56 (FIG. 2) reads transmit packet bytes out of buffers in the packet buffer RAM using direct memory access (DMA) cycles on the Attachment Bus and pushes them into the MIU TX FIFO buffer 58. The "EMPTY" threshold exceeded indication signals from the transmit FIFO 58 cause the transmit DMA control means 56 to initiate DMA activities by first arbitrating for ownership of the attachment bus. The "Full" threshold exceeded indication signals cause the transmit DMA control to terminate transfer of data. The use of DMA routines for transferring data on a bus is well-known in the art and will not be described further. As is shown in FIG. 2, both the transmit channel and the receive channel utilize network interface logic means 50 and physical interface circuit means 37. The physical interface circuit means 37 attaches to the network 10 and to the network interface logic means 50. The interface circuit means 37 typically includes digital and analog circuits, transformers, etc. Digital serial bit data is passed between the physical interface circuitry and the network interface logic means 50. The physical interface circuitry performs such functions as receive data and clock recovery, transmit data encoding and level conversion, and media association error detection, etc.

The network interface logic means 50 consists of digital circuits and it interfaces the receive and transmit FIFOs 44 and 48. Packet data bytes are passed to/from the receive/ transmit FIFO. Functions performed by the network interface logic means 60 include receive serial to parallel data conversion, receive framing, receive address match generation and copy control, receive CRC error detection, transmit parallel to serial data conversion, transmit media access control and transmit CRC generation and append to frames to be transmitted on the network. These functions are well within the skill of one skilled in the art and further discussion on them will not be given.

FIGS. 17, 18, 21–24 show detailed circuit/logic implementations for MIU TX PTI CTL 74 and NIU TX PTI CTL 68. The MIU TX PTI CTL 74 and NIU TX PTI CTL 68 manages the protocol required for transmitting data on the Integrated Command Data (ICD) bus (also shown in FIG. 2 as Local Bus System Means 60).

Figure 17A:
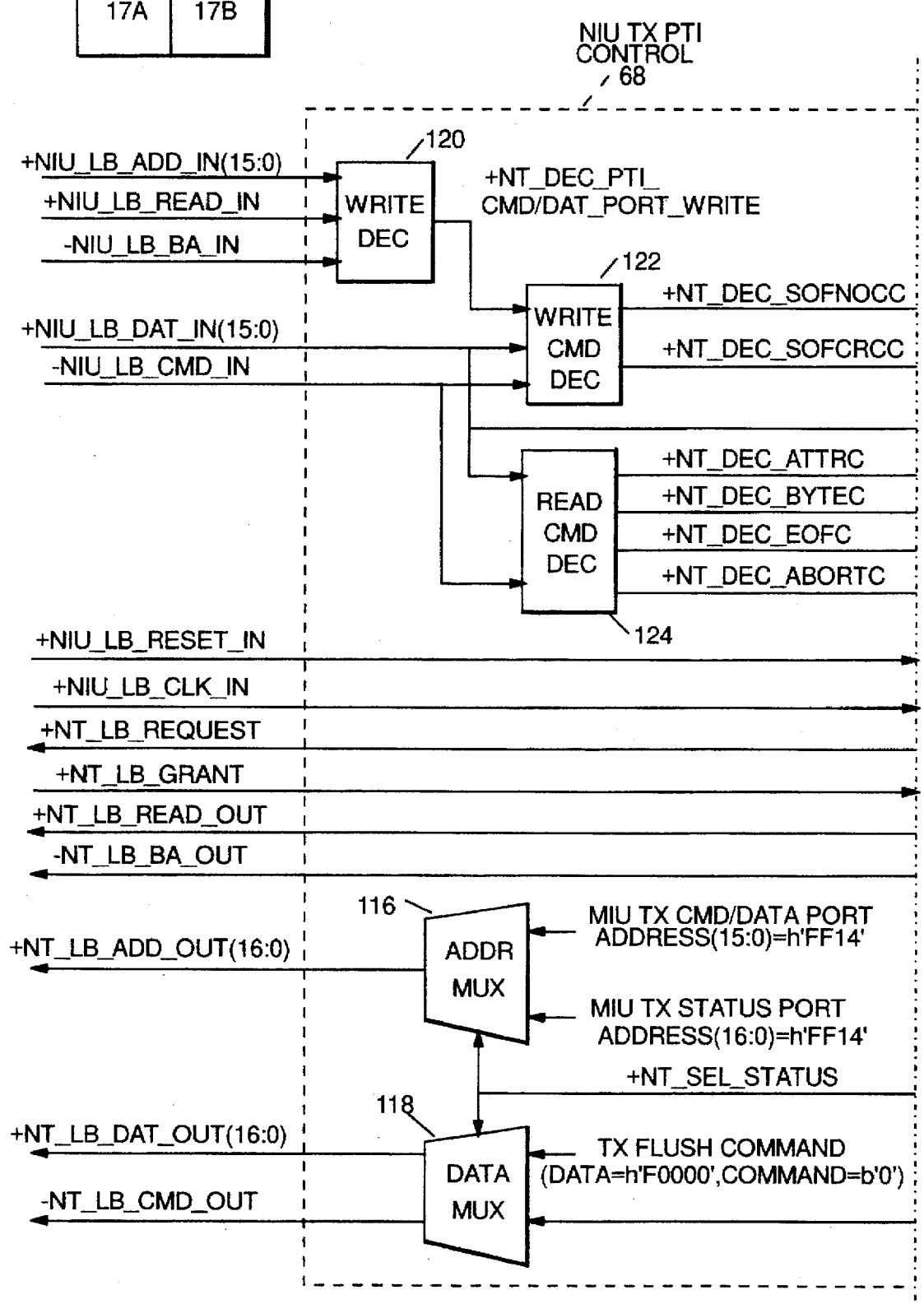
Figure 17B:
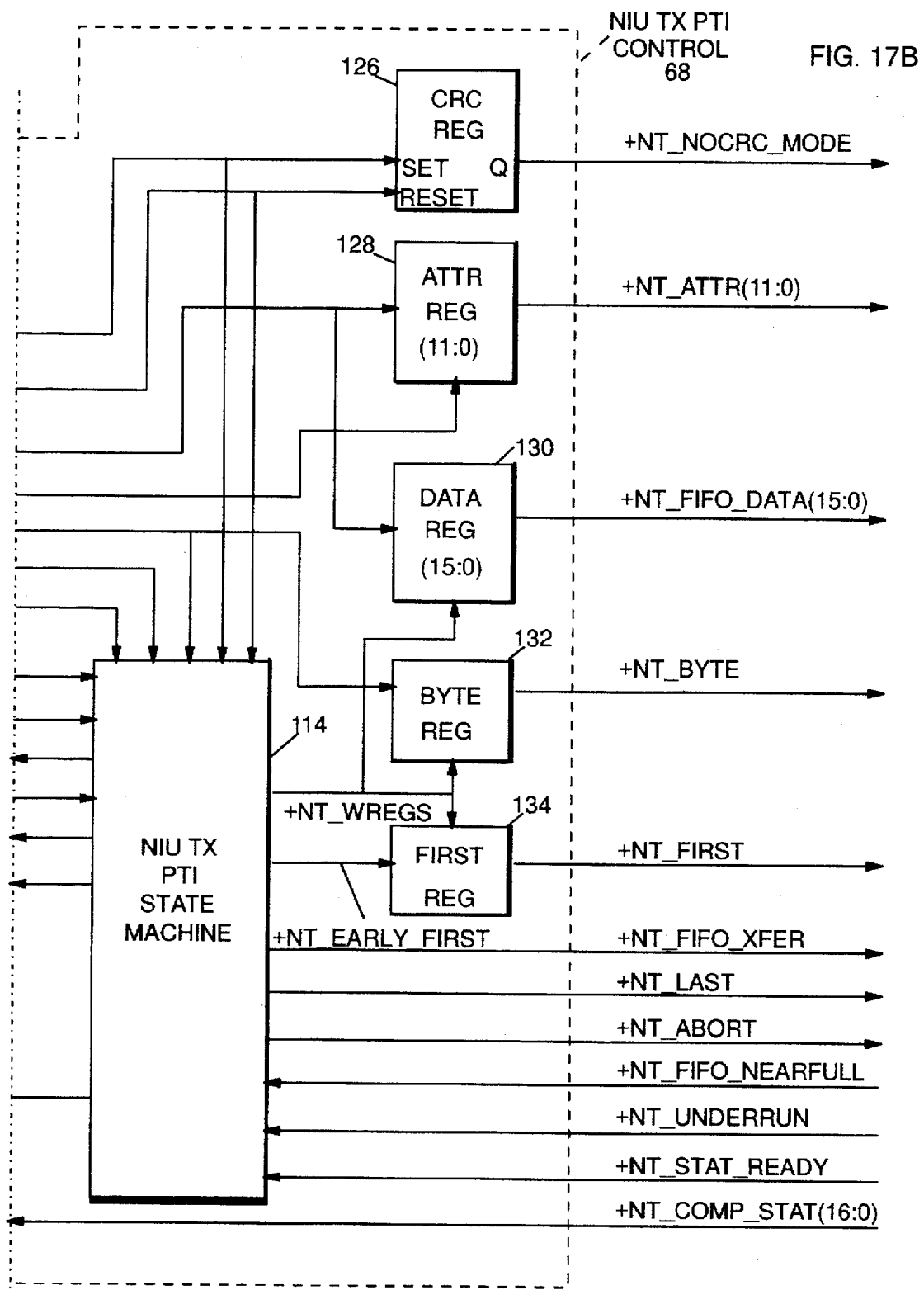

FIGS. 17A and 17B show a block diagram of the NIU TX PTI CTL 68. It is comprised of NIU TX PTI state machine 114. The NIU TX PTI state machine 114 is coupled through named interconnections to address MUX 116, Data MUX 118, write decode 120, write command decoder 122, read command decoder 124, CRC REG 126, ATTR REG 128, DATA REG 130, BYTE REG 132 and FIRST REG 134. The registers are used for storing specific types of information which are identified on their exit line. The multiplexers (MUX) perform multiplexing functions and the decoders perform decoding functions. The nomenclature used in this figure and the others follow the same pattern as outlined above. As a result, they will not be repeated here. The signals exiting from the NIU TX PTI CTL 68 and signals entering are identified by the respective names and follow the above-identified nomenclature.

Figure 18:
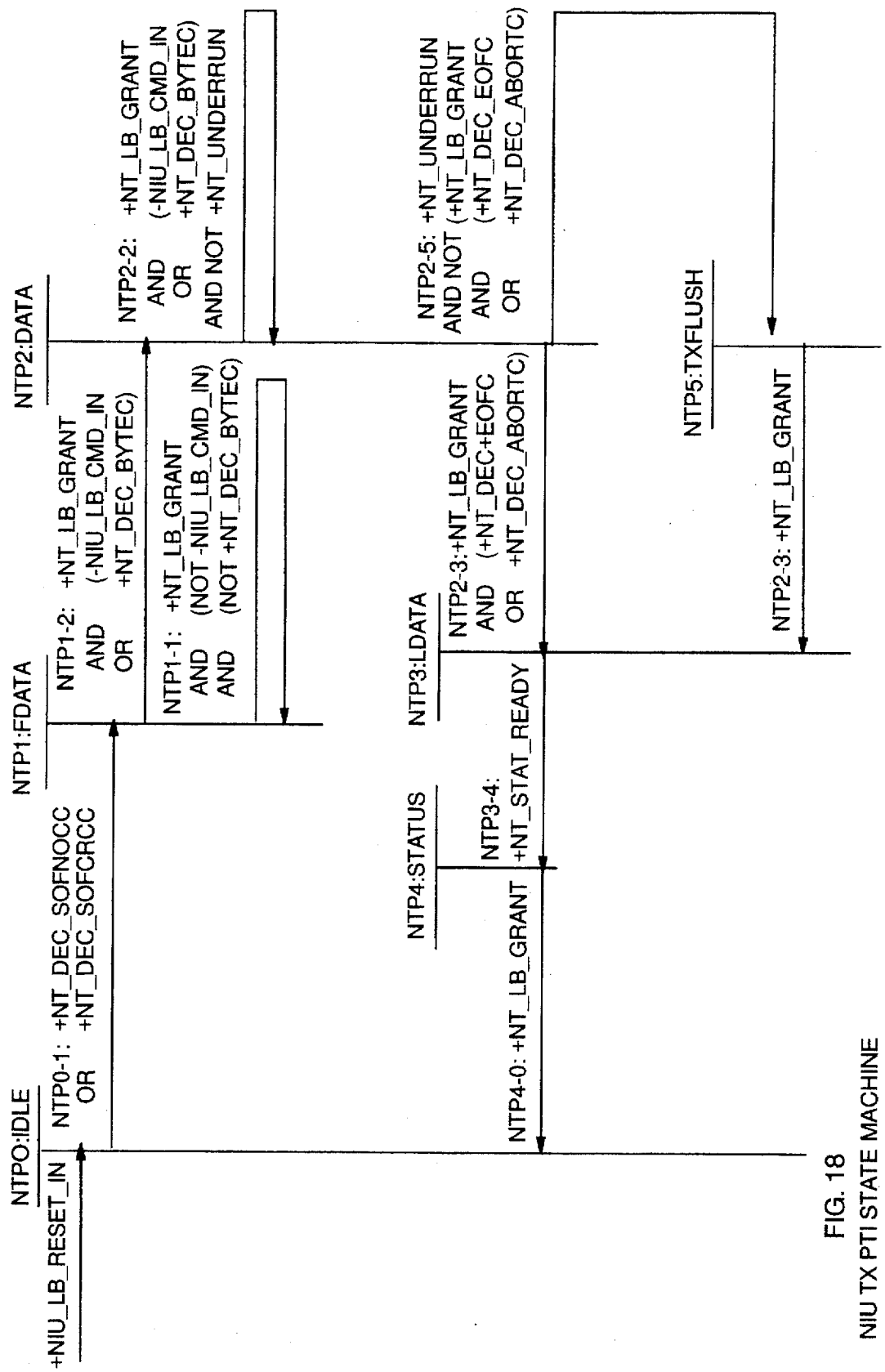
FIG. 18 shows a flow chart for the NIU TX PTI state machine.

FIG. 18 shows a state diagram for the NIU TX PTI state machine. The state machine has six states 0–5. The conditions which cause the state machine to move from one state to the other are shown in FIG. 18. As pointed out above, together with the examples given relative to other state machines, it is well within the skill of one skilled in the art to use the information in FIG. 18 to understand how the state machine operates and further description will not be given here.

FIG. 21 shows a table listing the output signals from the NIU TX PTI state machine and other NIU TX PTI signals. Similar to other tables discussed above, the signals generated are written on the left-hand side of the equal sign and the logical conditions needed for required signals are identified on the right-hand side of the figure. As stated above, together with the examples given, it is well within the skill of the art to utilize the information in FIG. 21 to understand the signals generated by the state machine and, as a result, further description of these signals are not warranted.

Figure 22A:
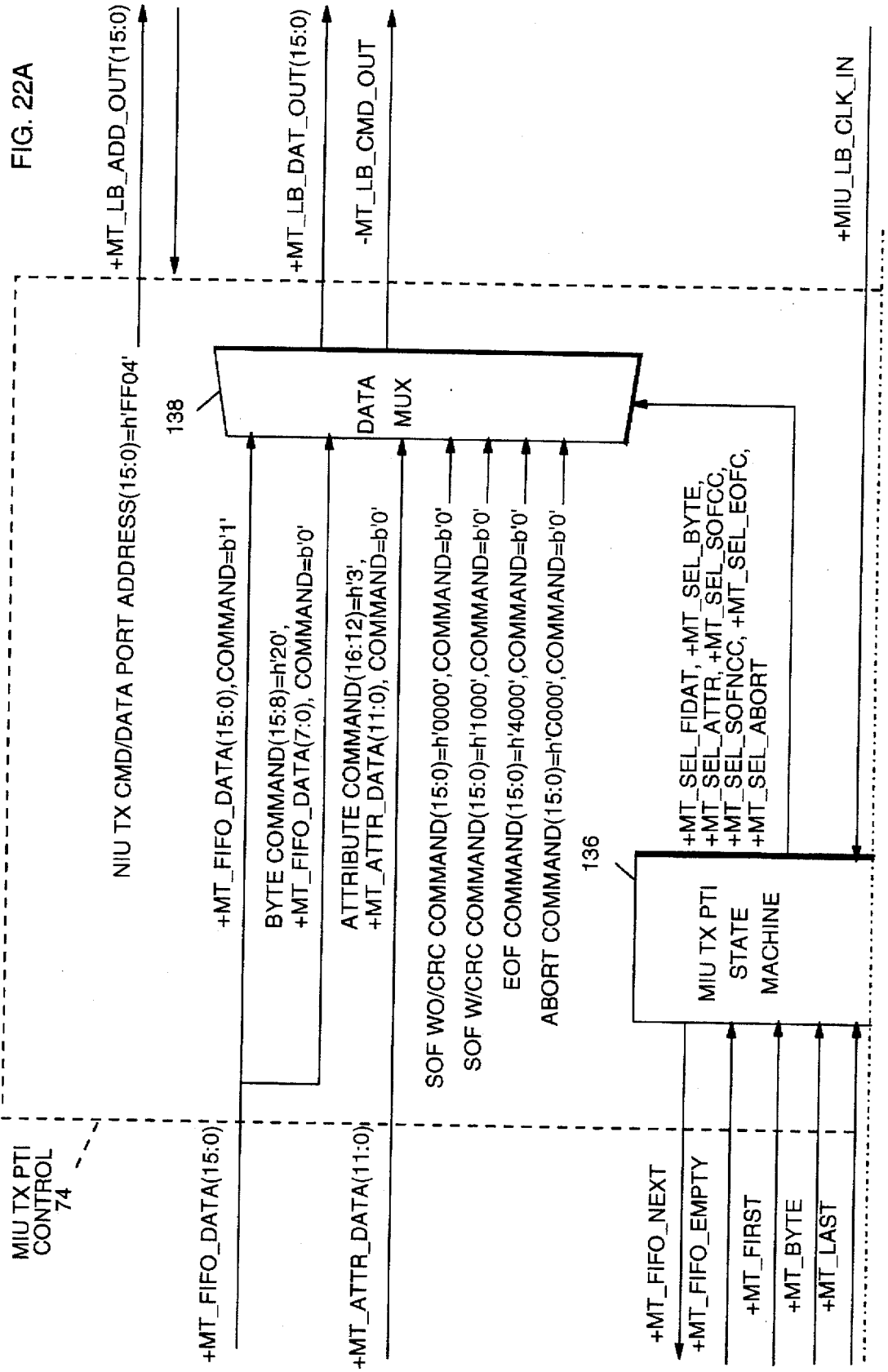
Figure 22B:
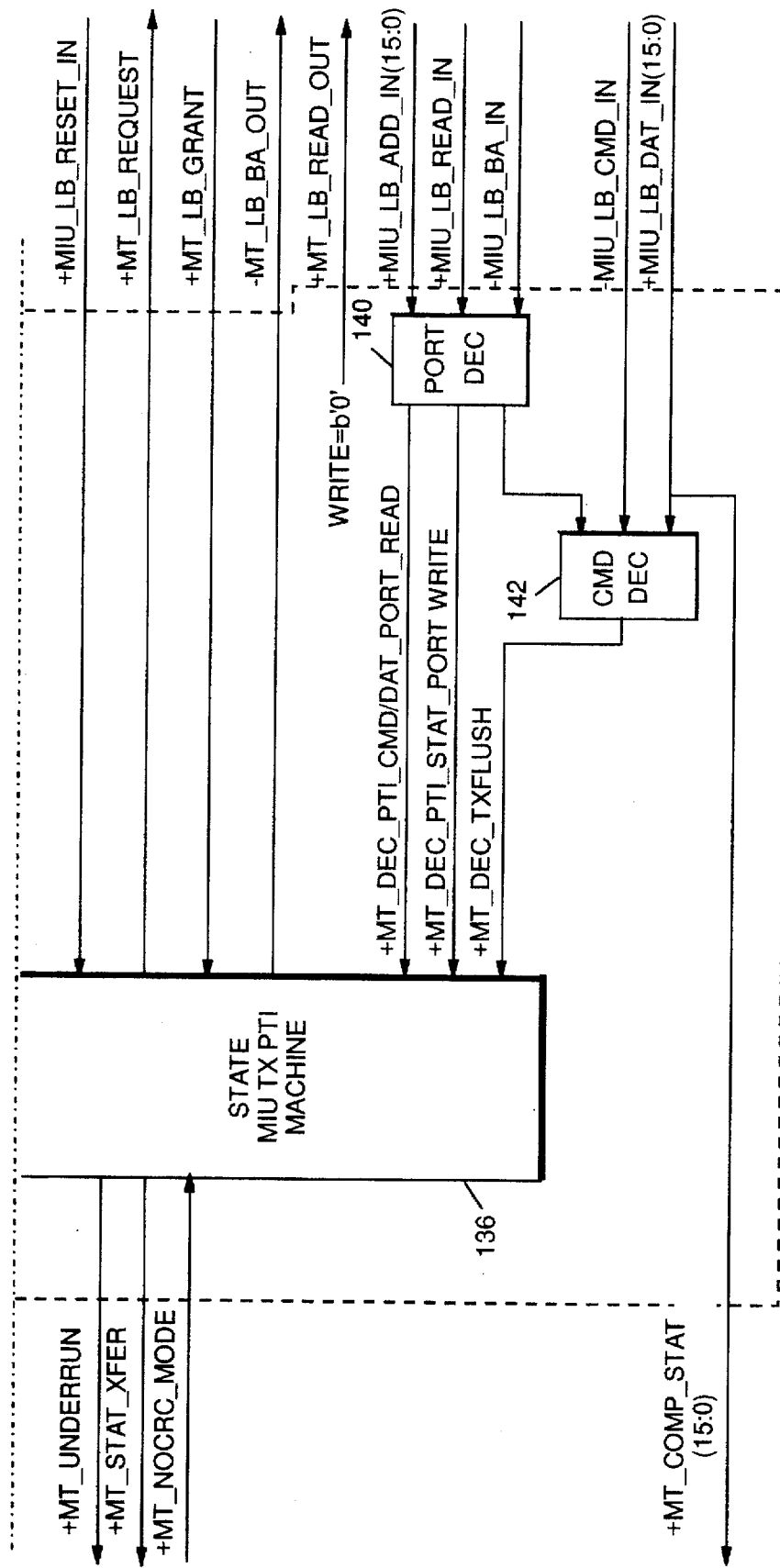

FIGS. 22A and B show a block diagram of the MIU TX PTI CTL 74. The MIU TX PTI CTL 74 includes a MIU TX PTI state machine 136 coupled through selected interconnections (identified in FIGS. 22A and B) to data MUX 138, port decoder 140 and command decoder 142. The signals which are used in the MIU TX PTI CTL 74 are identified in the figure. The nomenclature is similar to the one previously described, and as such, further description of this figure is not warranted.

Figure 23:
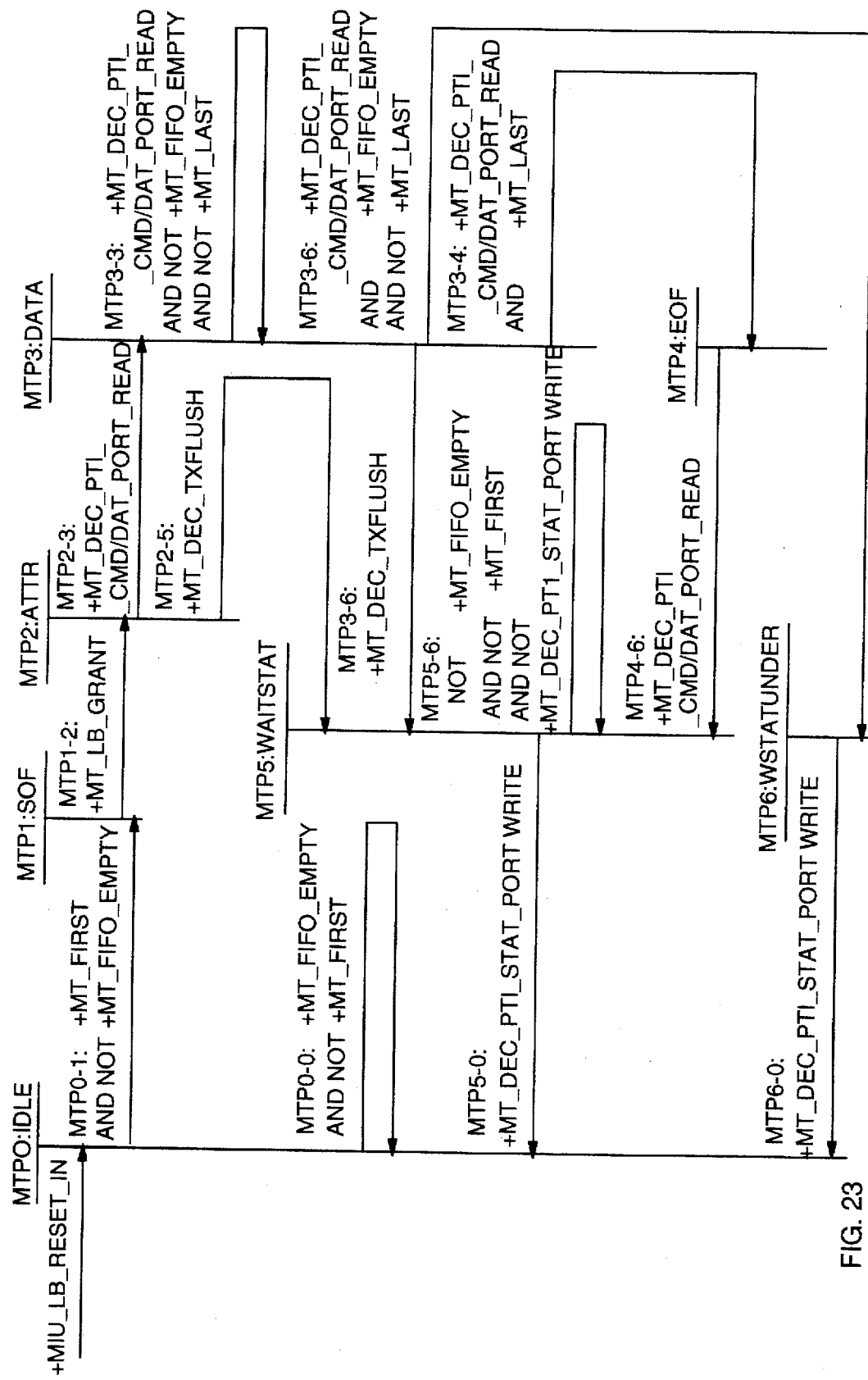
FIG. 23 shows a logic flow diagram for the MIU TX PTI state machine.

FIG. 23 shows a state diagram for the MIU TX PTI State Machine. This state machine has seven states 0–6. The conditions which cause a change in the state is identified and set forth in FIG. 23.

FIG. 24 shows a table listing the outputs from the MIU TX PTI state machine and other MIU TX PTI signals. The approach to read and understand this table is similar to the one discussed above and, as such, further details will not be given here. Suffice it to say that the particular signal is identified on the left-hand side of the equal sign and the name of the signal and logical function which the state machine must undergo in order to provide the required signal is listed on the right-hand side of the table.

In the embodiment shown and described for the purposes of illustrating how a PTI data/command stream is generated, none of the commands are present outside of the units that interface to the local bus. One of the advantages of PTI is that the nature of the commands is such that they may be carried "in-stream" in the adapter hardware, including the FIFOs, and thereby provide the means for maintaining the required control information. Therefore, in an alternate embodiment, commands may be easily passed through the FIFO by expanding the width of the FIFO by 1 bit which functions as a Command/Data indicator.

The above described invention segments a packet-orientated communications adapter into functional subunits including a protocol specific/machine attachment generic unit called Network Interface Unit (NIU), a machine attachment interface specific/protocol generic unit called a Machine Interface Unit (MIU), and a PTI interface between the units. This structure provides great flexibility and re-usability while maintaining high performance. The segmented adapter preserves investment in hardware and software across a "family" of adapters of various types, communication protocols and machine interface attachments. The segmented adapter is made possible through the use of a packet-orientated interface (packet transfer interface—PTI) that is generic to both specific network attachment/protocols and machine attachment interfaces. With the segmented adapter approach of the present invention, the NIU contains the functions required to support the attachment between the PTI and the network and is thereby, by definition, network attachment/protocol generic, while the MIU contains the function to support the attachment between the machine interface and the PTI and is, thereby, by definition, network system bus generic. Several benefits enure to the user of the disclosed packet transfer interface and the segmented adapter. Included in the benefits are:

A) The PTI is able to support multiple channels or independent streams of data over a single physical bus.

B) The PTI is compatible with standard processor memory type of busses. Transfer from multiple PTI receive and transmit channels as well as bus transfers not associated with any PTI channel can be freely intermixed over time without adverse affects; there are no sequencing requirements between the above types of transfer in order to insure proper operation.

C) The packet transfer interface utilizes command transfer for the passing of control information. Commands may be passed "in stream" with the data, such that there is a specific sequence relationship to the PTI-associated data transfers on the bus. Commands may also be passed asynchronously; that is, some commands have no relationship to the data being passed. The use of command transfer as described above allows for the necessary control information to be communicated without the need for a specific control bus or dedicated control signals. The data modifier signal referred to as the "Command" signal is used to distinguish data from command transfers on the Local Bus.

D) The PTI defines two sets of specific commands (one for transmit and one for receive) to allow for successful transfer of packets. The command set is arbitrarily and naturally expandable for applications where additional control/status information is required.

E) The PTI allows for command-specific attribute information to be transferred with the commands, providing enhanced control and status information transfer.

F) The PTI defines the correct sequence of commands and data transfers for both transmit and receive processes and for both formal and error scenarios, that allow the successful transfer of packets.

G) The PTI specifies that for both transfer and receive processes, that the NIU controls the transfer of data. This allows for simple, yet effective "pacing" of the data transfer per the demands of the attachment network.

While the invention has been particularly shown and described with reference to a preferred embodiment thereof, it will be understood by those skilled in the art that various other changes in form and detail may be made therein without departing from the spirit and scope of the invention.

What is claimed is:

1. A segmented adapter, for coupling a computing device to a Local Area network LAN, comprising:
   a network interface unit means for coupling to the Local Area network;
   a machine interface unit means for coupling to the computing device; and
   a packet transfer interface means interconnecting the network interface means and the machine interface means; said packet transfer interface means transmitting integrated frames through a single channel to the computing devices with said integrated frames comprises of LAN frames received from the Local Area network, coded in accordance with a specific LAN protocol, and interspersed with commands inserted in the LAN frames by the packet transfer means wherein the commands represent computing action to be taken, by the computing device, with respect to the sub-fields of the integrated frame.

2. A segmented adapter, for coupling a computing device to a Local Area network LAN, comprising:
   a network interface unit for coupling to the Local Area network;
   a machine interface unit for coupling to the computing device; and
   a packet transfer interface interconnecting the network interface and the machine interface; said packet transfer interface transmitting integrated frames through a single channel to the computing devices with said integrated frames comprised of LAN frames received from the Local Area network, coded in accordance with a specific LAN protocol, and interspersed with commands inserted in the LAN frames by the packet transfer interface wherein the commands represent computing action to be taken, by the computing device, with respect to the sub-fields of the integrated frame; and
   control means, operatively coupled with the packet transfer interface, for generating the commands and concatenating the commands to the selected subfields in the LAN frames.

3. A segmented adapter, for coupling a computing device to a Local Area network LAN, comprising:
   a network interface unit for coupling to the Local Area network;
   a machine interface unit for coupling to the computing device; and
   a packet transfer interface interconnecting the network interface and the machine interface; said packet transfer interface transmitting integrated frames through a single channel to the computing devices with said integrated frames comprised of LAN frames received from the Local Area network, coded in accordance with a specific LAN protocol, and interspersed with commands inserted in the LAN frames by the packet transfer interface wherein the commands represent computing action to be taken, by the computing device, with respect to the sub-fields of the integrated frame; said packet transfer interface including
   a data bus for transporting the integrated frames;
   an address bus;
   an identification means for transporting electrical signals indicating if command or data is being transmitted on the data bus with said electrical signal being transmitted to the computing device;
   a local bus controller for providing bus clocking signals and for granting access to the data bus and address bus;
   a network interface data control means coupled to the data bus, the address bus and the identification means; said network interface data control means activating selected conductors in the data bus, the address bus and identification means in response to data received from the communications network and receiving data from the data bus to be transmitted on said communication network; and
   a first control means, coupled to the network interface data control means, for generating the commands and inserting in the frames received from the communications network.

4. The segmented adapter of claim 3 further including a second control means, coupled to the network interface data control means, for receiving integrated frames from the data bus and segregating commands and other local bus protocol information so that a frame compatible with the Local Area network protocol is provided.

5. The segmented adapter of claim 4 further including a third control means, coupled to the data bus, for activating selected lines in the data bus in response to data received from the computing device and for receiving data from the data bus;
   fourth control means coupled to the third control means, for inserting predetermined commands in information to be transmitted on the local bus.

6. A device for transmitting information coded in accordance with a specific Local Area Network protocol between a data source and data sink, comprising:
   a bus for transmitting integrated frames between the data source and the data sink with each integrated frame being transmitted through a single channel on said bus;
   a first means operatively coupled to the bus and operable for receiving bus request signals from the data source and the data sink and awarding priority to use said bus;

a second means operatively coupled to the first means; said second means generating the integrated frames by receiving frames coded in accordance with the specific Local Area Network protocol, generating commands representative of control information which identifies sub-fields in the integrated frames and concatenating said commands to selected fields of the frame; and identification means, coupled to the second means, for transporting to the data source or data sink control signals, received from the second means, indicating if a command is on the bus.

7. The segmented adapter of claim 1 or claim 6 wherein the specific LAN protocol includes a token ring protocol.

8. The segmented adapter of claim 1 or claim 6 wherein the specific protocol includes a collision type protocol.

9. The segmented adapter of claim 6 wherein the specific LAN protocol includes a Token Ring protocol.

10. The segmented adapter of claim 6 wherein the specific protocol includes a collision type protocol.

* * * * *